United States Patent [19]

Mayper, Jr. et al.

[11] 4,241,402
[45] Dec. 23, 1980

[54] FINITE STATE AUTOMATON WITH MULTIPLE STATE TYPES

[75] Inventors: Victor Mayper, Jr., North Hollywood; Alex L. Nagy, Agourra; Richard M. Bird, Woodland Hills; Ju Ching Tu, Canoga Park; Lowell S. Michels, Los Angeles, all of Calif.

[73] Assignee: Operating Systems, Inc., Woodland Hills, Calif.

[21] Appl. No.: 950,715

[22] Filed: Oct. 12, 1978

[51] Int. Cl.³ .............................................. G06F 7/22
[52] U.S. Cl. .................................... 364/200; 370/100
[58] Field of Search ................ 364/200 MS File, 900

[56] References Cited

U.S. PATENT DOCUMENTS

| 3,435,423 | 3/1969 | Fuller | 340/172.5 |
| 3,568,156 | 3/1971 | Thompson | 340/172.5 |

OTHER PUBLICATIONS

Communications of the ACM, "A Generalized Technique for Symbol Manipulation . . . ", by Douglas T. Ross, presented 5/20–21/60.
Communications of the ACM; vol. 11, No. 12, Dec. 1968; "Automatic Generation of Efficient Lexical Processors", by Johnson et al.

Primary Examiner—David L. Stewart
Attorney, Agent, or Firm—Charlton M. Lewis

[57] ABSTRACT

The subject of this disclosure is a Finite State Automaton (FSA) used as part of a term detector employed in a digital pattern search system (searcher). In particular the invention includes various advances in the art of FSA design which make the FSA practical for pattern recognition.

Specifically, these advances minimize the amount of memory which is required in each FSA in performing pattern recognition, and allow a speed capability such that the searching can be performed at the rate at which a mass storage medium can supply data. The large amount of memory required and the low speed of processing in the prior state of the art made the use of an FSA impractical for most real applications.

The new advances include the following:
An adaptation of the indexing means described in reference 4, which allows simple selection of the correct success transition state from a number of possible success states;
The partitioning of searchable digital patterns into parts (called nibbles) to reduce the amount of memory used within an FSA;
The use of various types of states to allow the detection of specific input patterns in the presence of don't-care patterns;
The use of multiple FSA's to reduce the amount of memory needed in these FSA's when handling don't-care patterns;
The unique design of an FSA to search for multiple sequential input patterns;
The unique features of the FSA design to allow recognition of numerical ranges of values from among numerical data.

40 Claims, 18 Drawing Figures

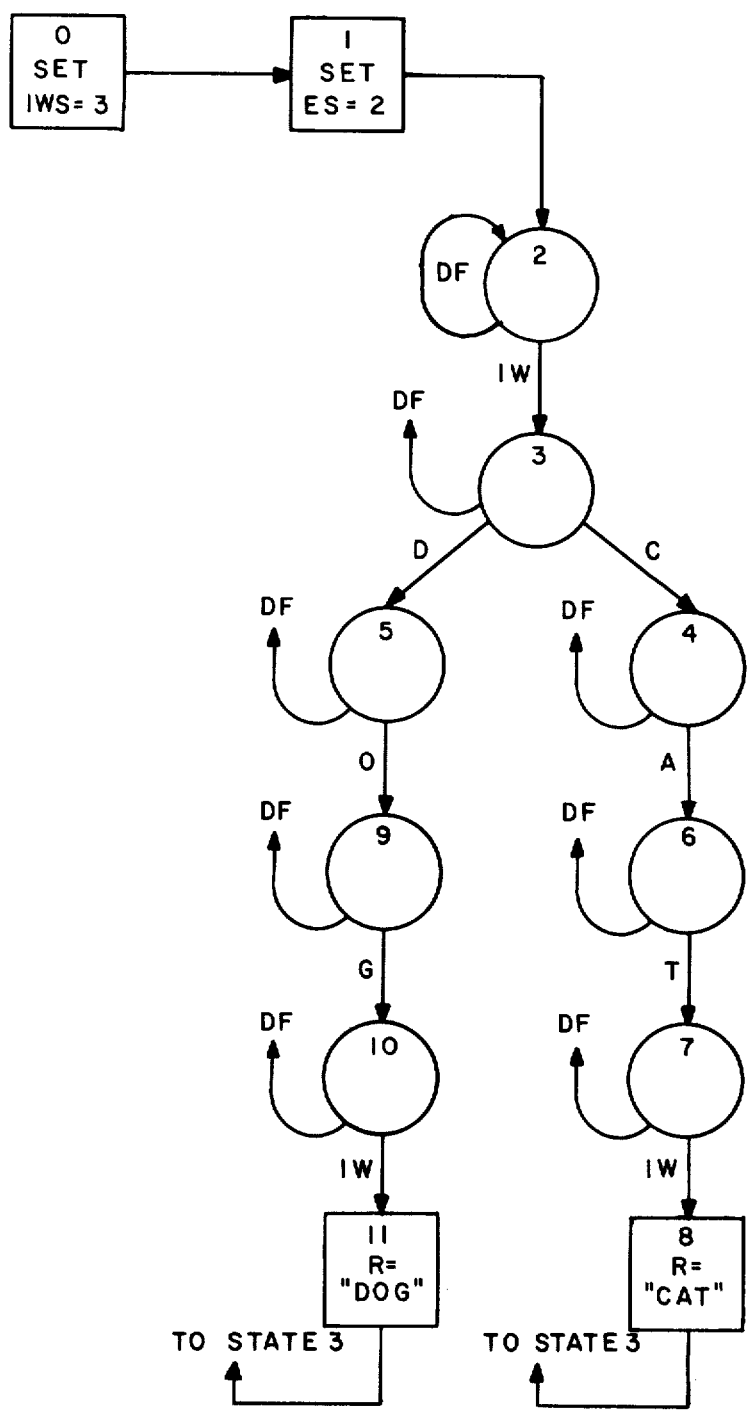
LEGEND:
ES — ELSE DEFAULT STATE
IWS — INTERWORD DEFAULT STATE
DF — DEFAULT
IW — INTERWORD INPUT
R — REPORT
FIGURE 3
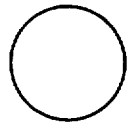 — DECISION STATE
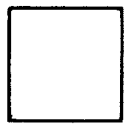 — INTERMEDIATE STATE LEGEND
ES – ELSE DEFAULT STATE
IWS – INTERWORD DEFAULT STATE
DF – ELSE OR INTERWORD DEFAULT
R – REPORT

– INDEX TYPE STATE

– SET DEFAULT TYPE OR REPORT TYPE STATE

– JUMP TYPE STATE

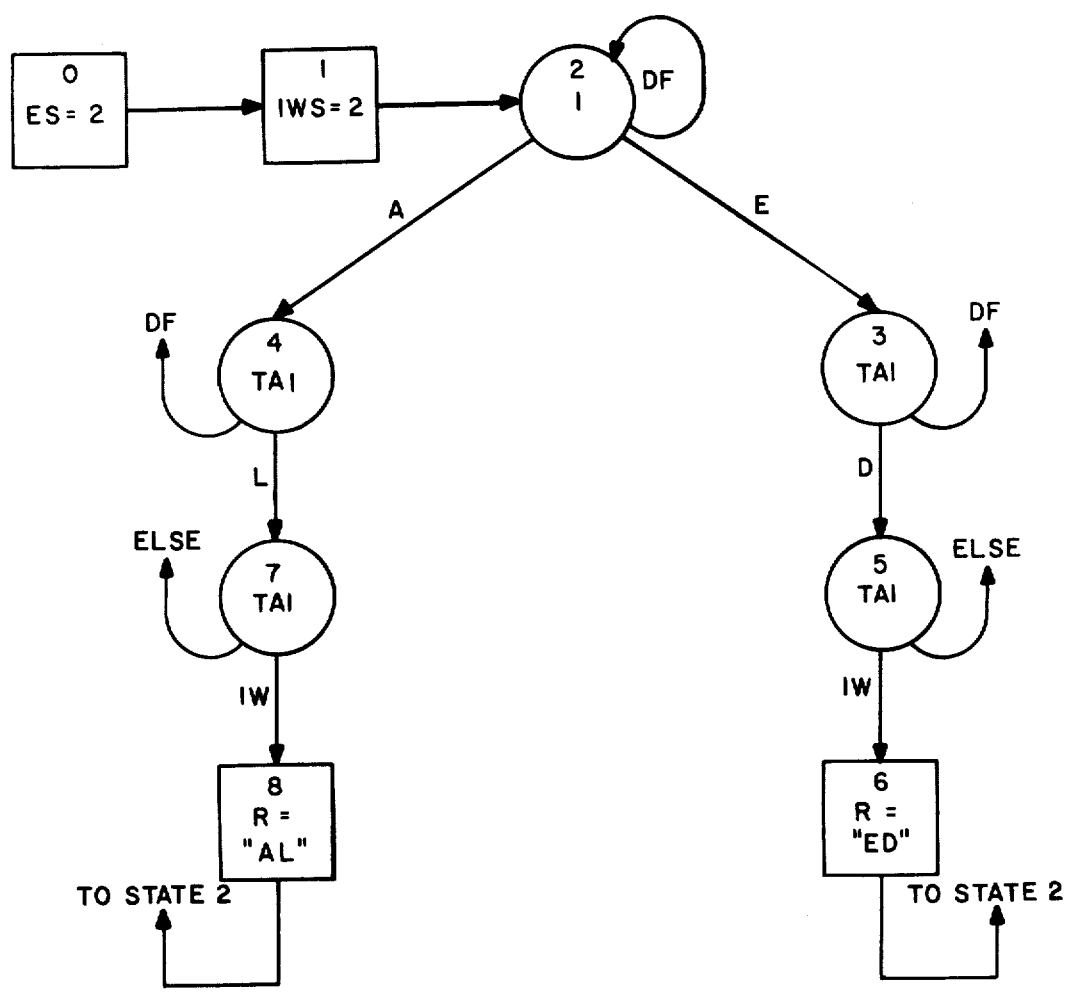
LEGEND:
ES    ELSE DEFAULT STATE
IWS   INTERWORD DEFAULT STATE
IW    INTERWORD
R     REPORT
DF    ELSE OR INTERWORD DEFAULT
FIGURE 10
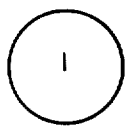 INDEX TYPE STATE
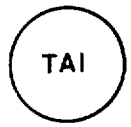 TRY AGAIN INDEX TYPE STATE
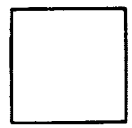 CHANGE DEFAULT TYPE OR REPORT TYPE STATE

NOTE: INDEX STATE ARTIFICIAL DEFAULT

FINITE STATE AUTOMATON WITH MULTIPLE STATE TYPES

BACKGROUND OF THE INVENTION

This invention relates to the use of computer technology for the searching of a mass of digitally stored data for the purpose of recognizing specified patterns within the stored data, allowing the retrieval of data associated with the specified patterns. The most common such application is in the searching of stored free-form textual data to locate documents or other common text groupings which contain specified words, phrases, or numbers. However, the invention described herein is applicable to other digital pattern recognition applications such as might involve digitized photographs, maps, etc.

Retrieval of digital data from mass storage systems is performed by addressing that portion of the mass memory which is known to contain the desired data. There are two ways of knowing where that portion is: either by continuously keeping an index of the data versus the storage address, or by serially searching the entire data base for the desired data pattern. When the amount of such data is large, and particularly when the data base is subject to frequent changes and/or searches, ordinary computers have proven to be too slow when employing either of these methods.

As a result, special mechanisms have been designed to handle the cumbersome task of serially searching for desired patterns. The references provide a list of patents (granted and pending), plus published documents relating to such mechanisms. The patents listed are considered to be irrelevant to the mechanisms described in this disclosure, as they employ completely different techniques.

On the other hand, references 6 and 7 both described the general application of FSA's to the task of text searching. Reference 6, in particular, describes a machine architecture involving a microprocessor.

Prior Method:

The general method of reference 6 employs a table of stored words associated with each state. This table identifies all possible transition states for every possible input character. At each state, the associated table is searched for the character or character group corresponding to the input character, and when found an associated stored code indicates the transition state.

In order to conserve table storage, the possible input byte codes are grouped, depending upon the nature of the input queries, such that a given transition may occur for a number of possible inputs. One or more such groups may define default states; i.e. the default state identities are explicitly defined in the table.

The successful completion of a state sequence then requires a stored table and a table search for every state in the sequence. A stored bit at the end of the sequence indicates a successful completion of the sequence.

A microprocessor is used for implementing these searches. However, because there is a search required at each state, the processing time is too great to keep up with a character stream which can be expected from a mass storage unit such as a disk. The paper indicates that a minimum of 4.5 microseconds plus 0.9 microseconds per table probe (examination of one table entry) is required per state. Since a modern disk can supply characters at a rate of 1 million per second (typically), the method is considered at least 5 times too slow.

The invention described herein utilizes standard electronic logic techniques to implement an unique architecture which eliminates or radically reduces the difficulties which the approach of reference 6 presents. The speed capability is sufficient to keep up with a disk character rate, and memory requirements are sufficiently minimized to allow many dozens of queries to be handled simultaneously. In addition, other capabilities, such as numeric ranging, are now feasible.

REFERENCES

1. U.S. Pat. No. 3,435,423: Data Processing Systems; Fuller, Worthy, et al
2. U.S. Pat. No. 4,044,336: File Searching System With Variable Record. Boundaries; Babb
3. U.S. patent application Ser. No. 772,935: Associative. Crosspoint Processor System; Bird and Tu; issued May 1, 1979 as Pat. No. 4,152,762.
4. U.S. patent application (companion to this application); Selection of Finite Success States by Indexing; Bird and Tu; Ser. No. 950,326, filed Oct. 11, 1978.
5. On The Construction and Minimization of Finite State Automata; Millan and de Carvalho; a monograph published by the Pontificia Universidade Catolica do Rio de Janeiro, July, 1971.
6. The Design of a Microprogrammed Finite State Machine for Full-Text Retrieval; Bullen and Millen; AFIPS Conference Proceeding, Fall Joint Computer Conference, 1972, pp. 479–488.
7. A Survey of Regular Expressions and Their Applications; Brzozowski; IRE Transactions on Electronic Computers, June 1962, Volume EC-11.

DEFINITIONS

Figure 1:
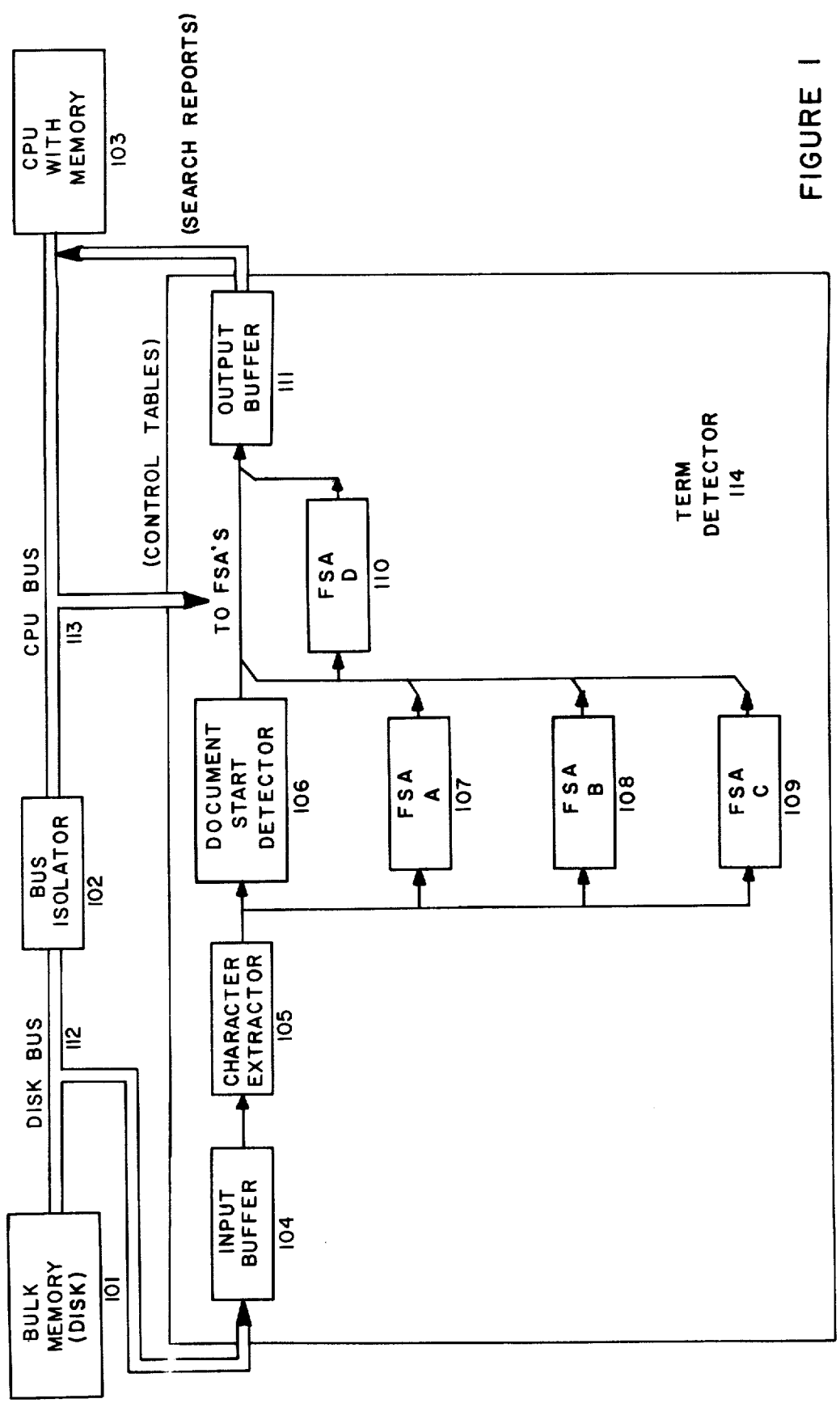
FIG. 1—Block diagram of typical system using the invention.

The following is a series of definitions of terms used in this disclosure.

| | |
|---|---|
| Base State Number | A numerical value, part of the state word, identifying a success state, typically the first of a contiguous series of success states |
| BUS | A digital communication means for transmitting multiple bits |
| Byte | An 8-bit code, standard within the industry, for representing each of a set of elements |
| Change Default State | A type of state which changes the default state identity |
| Character | One of an arbitrarily coded set of stored data elements; usually a coded representation of a text element |
| Control Tables | The data stored within an FSA which control the sequence of state transitions |
| SWP | Sequential Word Phrase |
| Default | A failure of an attempted match of an incoming code to a code stored within the state word |
| Default State | The state to which a transition is made on a default |
| Else Default | A default on a non-interword character |
| Finite State Automaton | A device which is said to exist in only one of a multiplicity of possible states at a time, and transitions from one state to another |
| FLDC | A Fixed-Length-Don't-Care character |
| FSA | Finite State Automaton |
| Index Number | In an index state, a calculated numeric value added to the base state number to identify the next state |
| Index State | One of the six state types, used for choosing one of a number of possible success transitions |
| Indexing Bits | A series of mask bits within the state word, each corresponding to one possible value of an incoming digital pattern to identify possible success conditions |
| Interword Character | Any character which is normally considered to separate textual words, such as a space, carriage return, and certain symbols |
| Interword Default | A default on an interword character |
| Jump State | A type of state which changes the state sequence |
| Nibble | A part of a character, typically comprising four bits |
| Query | A user specified pattern against which a search is to be made |
| Report State | A state type used to issue an unique identifying output code indicating the successful search for a specified pattern |
| Sequential State | A type of state capable of comparing a number of incoming characters against codes stored within the state word |
| State | The instantaneous condition of an FSA, represented by the address of the state control table memory used for controlling state action |
| State Control Table | The totality of all state words |
| State Sequence | A particular series of states identified with a successful search for a given pattern |
| State Type | One of six different types of actions possible for different states |
| State Word | The contents of the state control table memory location identified with a particular state, which are used to control the FSA in performing the action required for the state |
| Term | A word or phrase, including possible don't care strings |
| Transition | Change of state |
| Try-Again Index State | An index state which, if it defaults, inhibits a request for a new input character such that the present character can be examined by a new state sequence starting with the default state |
| VLDC | Variable-Length-Don't-Care character string |

DESCRIPTION OF PREFERRED EMBODIMENTS

FIG. 1 is a block diagram of a typical system which can make use of this invention. A data processing system used for text searching is shown, comprising the following major elements:

°—a central processing unit (CPU) 103 with its memory device,
°—a bulk memory device 101 such as a rotating disk,
°—the term detector 114

All of these items are interconnected with a cable device (BUS) 112 and 113, in which is installed a BUS isolator 102. In a quiescent state the BUS isolator is inactive, and transparent to BUS operation.

Preparatory to searching the bulk memory (disk) for every occurrence of the user-specified query terms, the CPU translates the query terms into a set of control tables for use by the term detector during the actual search. These tables are then loaded into those sections of the term detector herein called FSA's (Finite State Automatons) 107, 108, 109, and 110, of which there can be any practical number. In subsequent descriptions herein four FSA's are assumed, FSA's A, B, C, and D.

The translation by the CPU of the user queries into control tables for the FSA's is an important and complex activity necessary for operation of the FSA's, although it is not part of the invention. The translation typically utilizes an adaptation of the algorithm described in reference 5.

The search is started under CPU control when the BUS isolator 102 isolates the disk BUS 112 from the CPU BUS 113, such that data supplied by the disk to the term detector do not interfere with CPU activities involving the CPU BUS.

The term detector has three BUS interfaces:

° —a disk BUS interface for receiving search data from the disk,

° —a CPU BUS interface for receiving the said FSA control tables,

° —an output BUS interface for transfering output reports as a result of its search operations.

Data received by the term detector from the disk during a search operation pass through the sychronizing input buffer 104 and the character extracting circuits 105, and are presented one character at a time to FSA's A, B, and C, 107, 108, and 109, and to the document start detector 106.

The document start detector, when it detects a special start character indicating the start of a new document received from the disk, supplies an output report to the synchronizing output buffer 111, thence to the CPU. This report consists of a numerical document identity associated with the document, received with the start character from the disk.

Each FSA (A, B, and C), operating independently of the other FSA's, passes through various state sequences as data are received, determined by the control tables previously loaded. At the end of each state sequence, as determined by these control tables, the FSA will issue an output report code, unique for each sequence. In essence this report is an indication that the FSA has detected a certain text word specified by an original query and identifies that word by the unique report code. This output report is supplied to either the CPU through the output synchronizing buffer, or to FSA D, or both.

FSA D accepts word report codes in the same manner that FSA's A, B, and C accept input characters. But since each such code represents an unique word, the state sequences followed by FSA D represent unique sequences or words, or sequential word phrases (SWP's). Output report codes supplied by FSA D to the CPU then uniquely identify SWP terms specified in the user's queries.

In the embodiment shown in FIG. 1, the implementations of FSA's A, B, and C are typically identical in form. The activities described above for these FSA's in detecting individual terms could be performed by only one FSA if the queries were simple in their content. However, the invention provides a useful separation of function for more complex queries in a manner to be described, typically determined entirely by the content of the control tables loaded into each FSA by the CPU.

FSA STATE DESCRIPTIONS

An FSA is defined as a device which can exist in only one of a multiplicity of possible states at a time, and steps from one such state to another selected state on the basis on control tables stored within the FSA as incoming signals are received. A given state accomplishes a specific task, which is determined by certain data stored in a "state word" associated with that state in the state control table memory. Part of the state word designates one of several modes of operation for the state; these modes are called "state types." Although there may be any practical number of state types, in the implementation to be described there are six types, grouped into two groups: decision states and intermediate (non-decision) states, as follows:

| TYPE | PURPOSE | DESCRIPTION SUMMARY |
| --- | --- | --- |
| Index (decision) | To control the transition to one of a multiplicity of possible success states. | By the use of indexing bits, each corresponding to one possible value of an input code, an index is calculated and added to a base number to become the next state identity. |
| Try-again Index (decision) | Similar to Index plus the ability to inhibit a request for the next input character which normally follows a default of a decision state. | Same as Index with a request inhibit circuit. |
| Sequential (decision) | To conserve memory required for index states when the indexing capability is not required. | Storing of multiple character codes within one state word against which successive input codes are compared directly to achieve either a single success or a default. |
| Change Default (intermediate) | To change the state identity to which a transition is made when one of the decision states defaults. | The state word stores a numeric value which becomes the identity of either the interword default state, or else default state, or both. |
| Jump (intermediate) | To cause a transition from one state sequence to another. | The state word stores the identity of the next following state. |
| Report (intermediate) | To cause a specific code, representing a query term, to be reported at the end of a sequence of states resulting from the required input string. | The state word stores the required report code which is transferred to an output circuit. |

Figure 2:
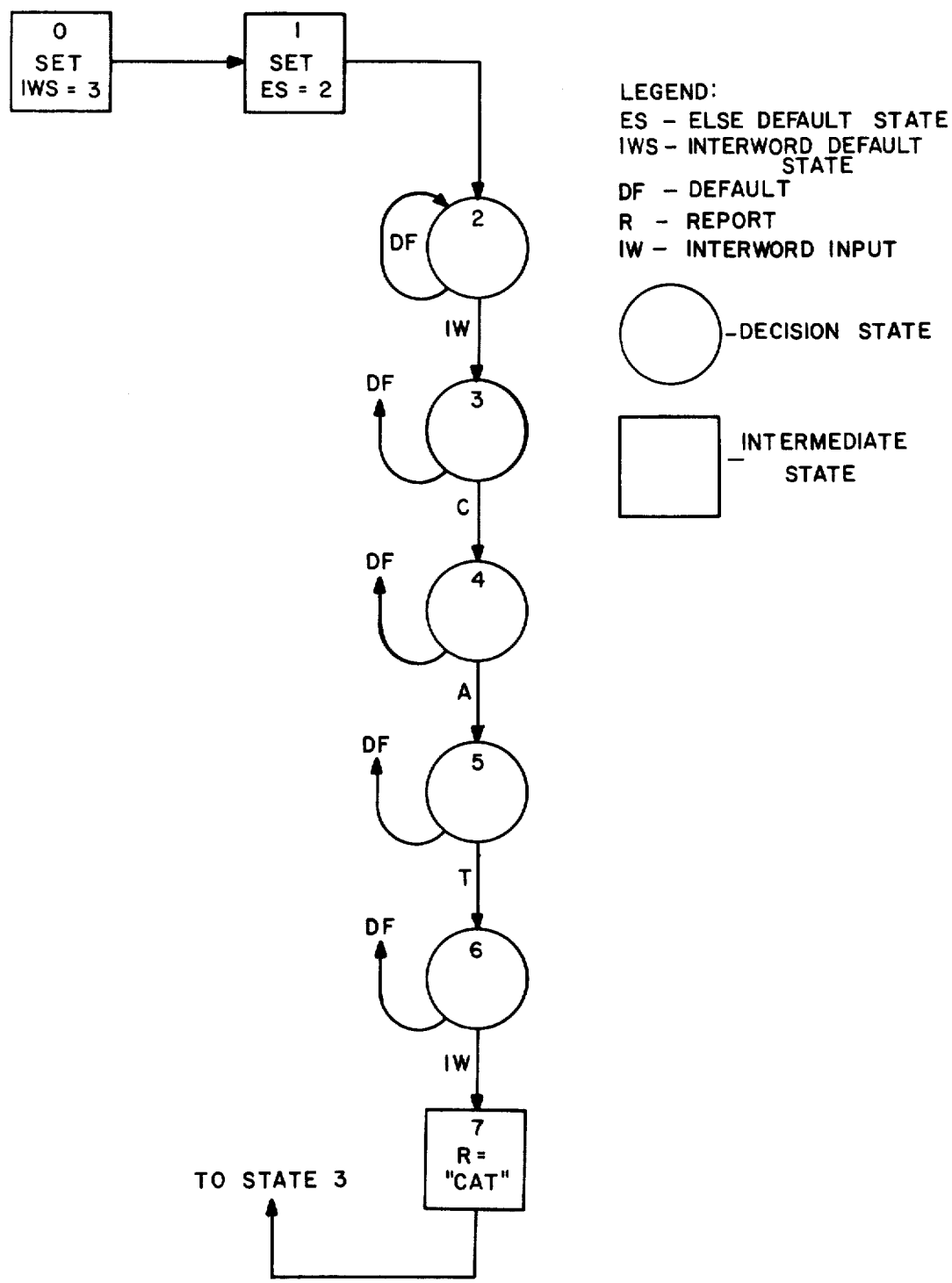
FIG. 2—Basic concept of a state diagram
FIG. 3—A multiple path state diagram
FIG. 3A—State diagram using a sequential type state
FIG. 4—State word format of an index type state
FIG. 4A—An indexing example involving four possible success states
FIG. 5—A state diagram employing nibbles
FIG. 6—Summary of state word formats for all state types
FIG. 7—Block diagram of typical FSA embodiment
FIG. 8—State diagram involving an embedded VLDC string in the work "HONOR"
FIG. 9—Illustration of the use of jump type states in a state diagram involving all words ending in "ED" or "AL"
FIG. 10—Use of try-again index states for eliminating jump states
FIG. 11—Example of duplicate state sequences for combined leading and trailing VLDC terms in one FSA
FIG. 12—Example of multiplicative state expansion involving combined leading and embedded VLDC terms in one FSA
FIG. 13—State diagrams of leading and embedded VLDC terms in separate FSA's
FIG. 14—Example of a state diagram for numeric ranging
FIG. 15—Block diagram of FSA used for sequential word phrases
FIG. 16—State diagram involving multiple sequential word phrases

Basic Concepts:

FIG. 2 illustrates the basic concept of FSA states. Each block or circle in the figure represents a single state, numbered as shown. An unique state word is read from the control table memory for each state, which then determines the type of operation to be performed for that particular state, after which a transition is made to an identified next state.

Specifically, at each decision state the state word supplies certain control signals to cause a transition to the next state in sequence if the required success character (as indicated) is received. If the required success character is not received, a default is said to occur, and a transition is made to a default state, either state 2 or state 3 in FIG. 2, as described below.

Change Default State Type:

As characters are received by the FSA they are typically classified as either "interword" or "other" characters. An interword character can be a "space" or any one of certain symbols or some control character such as a carriage return. The other characters usually include all the alphabetics, numerics, and some selected symbols such as "$".

Now at any decision state if the required success character is not encountered as an input, a transition is made to either the "interword default state " or the "else default state," (both previously indentified), depending upon whether the incoming character is an interword character or some other character.

When the sequence of FIG. 2 starts at state 0, the first thing that happens is that the "interword default state" is identified; in a similar manner, at state 1 the "else default state" is identified. These states normally remain identified throughout all subsequent states.

States 0 and 1 are "Change Default" type states. In this type of state the default state identity (either interword or else) is stored within the state word and placed in one of two registeres for later use. Furthermore, the default identities can be changed at any time in a state sequence. This ability to change the identity of the default states has far reaching implications in the treatment of "don't-care" character strings, to be described, and is a key feature of this invention.

Report State:

The last state in FIG. 2 is a report state. Its function is to supply an output code, stored within the state word, as an unique identification code for the word or phrase associated with the successful sequence of states.

This code is generated by the CPU from the user queries and is loaded with the state word as part of the control tables.

Index State:

FIG. 3 is an extension of the basic FSA concept illustrating the ability to search for a multiplicity of words. For purposes of illustration consider state 3. The state word read from the control table memory for this state sets up control circuits within the FSA to accomplish the following:
- °—If the received input character is a "C," a transition to state 4 will be controlled;
- °—If the received input character is a "D," a transition to state 5 is controlled;
- °—If the received input character is any other text character or an interword, a default transition is made to either state 2 or 3 depending upon whether the character is an interword or a text character, in the same manner as previously described.

The state sequence 5, 9, 10, and 11 is followed if the letters "O" and "G" are received after the "D," followed by an interword. State 11 then issues a report for "DOG". In a similar manner the sequence 4, 6, 7, and 8 is followed for "CAT".

State 3 in the above described sequences is an "index" state. An index state is a state which may cause a transition to one of a number of possible success states depending upon the value of the incoming code. In essence a success can be achieved by any one of a number of different input codes. If the incoming code is not one of the success codes, a transition is made to either the else or interword default state, as previously described.

Figure 4:
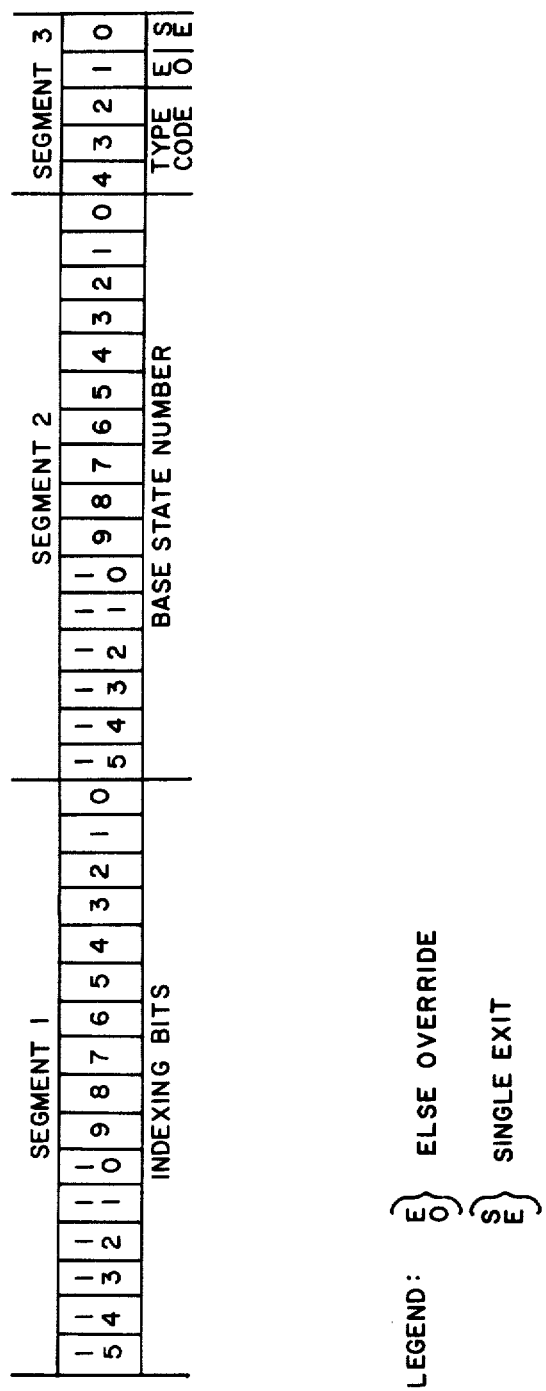

The name of the state type (index) derives from the method used to select the next state from among the possible success states. This method is the subject of reference 4. FIG. 4 illustrates a format for a state word of an index state, created by the CPU and stored in the FSA control table memory. It is composed of three parts or segments (right to left):
- °—a control code which distinguishes the index state from other types of states, and supplies other control signals to be described,
- °—a base state number,
- °—a group of indexing bits designating the possible input success codes.

There is one indexing bit for each possible value of the input code. In this illustrative example the input code is assumed to consist of only 4 bits; hence there are 16 indexing bits for the 16 combinations of 4 bits. If a one is stored in a specific bit position corresponding to the incoming code, a success transition is made; conversely a zero in the bit position is a default.

If there is only one possible input code to be considered as a success code, only one indexing bit is set, and the next state is designated by the base state number. If there are two possible successes as in FIG. 3, two of the indexing bits are set, and the next state is either the base state number or the base state number plus 1, depending upon which of the two possible success codes are received. If three indexing bits are set, there are three possible next success states: the base state number, the base state number plus one, and the base state number plus two. Etc.

The possible success states, whatever their number in a particular case, are assigned consecutive identifying numbers of which the first is the base state number taken from the index state word. Each such state in this contiguous set normally is not part of a state sequence involving any other such state. Therefore, a transition from each such state typically must be to a state outside the set.

The choice of one of these states as the correct success state is made by generating an index number from the indexing bits and the incoming code. The index number is typically derived by counting the number of indexing bits found to be set to the left, say, of the bit which corresponds to the incoming code. This count is then added to the base state number to become the next state identity upon a successful match. This procedure has the great advantage of requiring memory to store the identity of only the base state, rather than having to store the identities of all success states.

Sequential State Type:

A sequential state is a type of state where the mode of operation is such that multiple sequential decisions on a succession of input characters may be made within one state. The invention makes memory available within a single state word for storing the desired search codes, and these are compared with successive input characters one at a time. If each compare is a success, the next character is compared; etc. If the compare fails, one of the two default transitions is made as described above. if all characters within one state word compare in succession, the next state is taken in numerical order; i.e. there is no requirement to explicitly identify the next state with a numerical value stored in the state word.

Figure 3A:
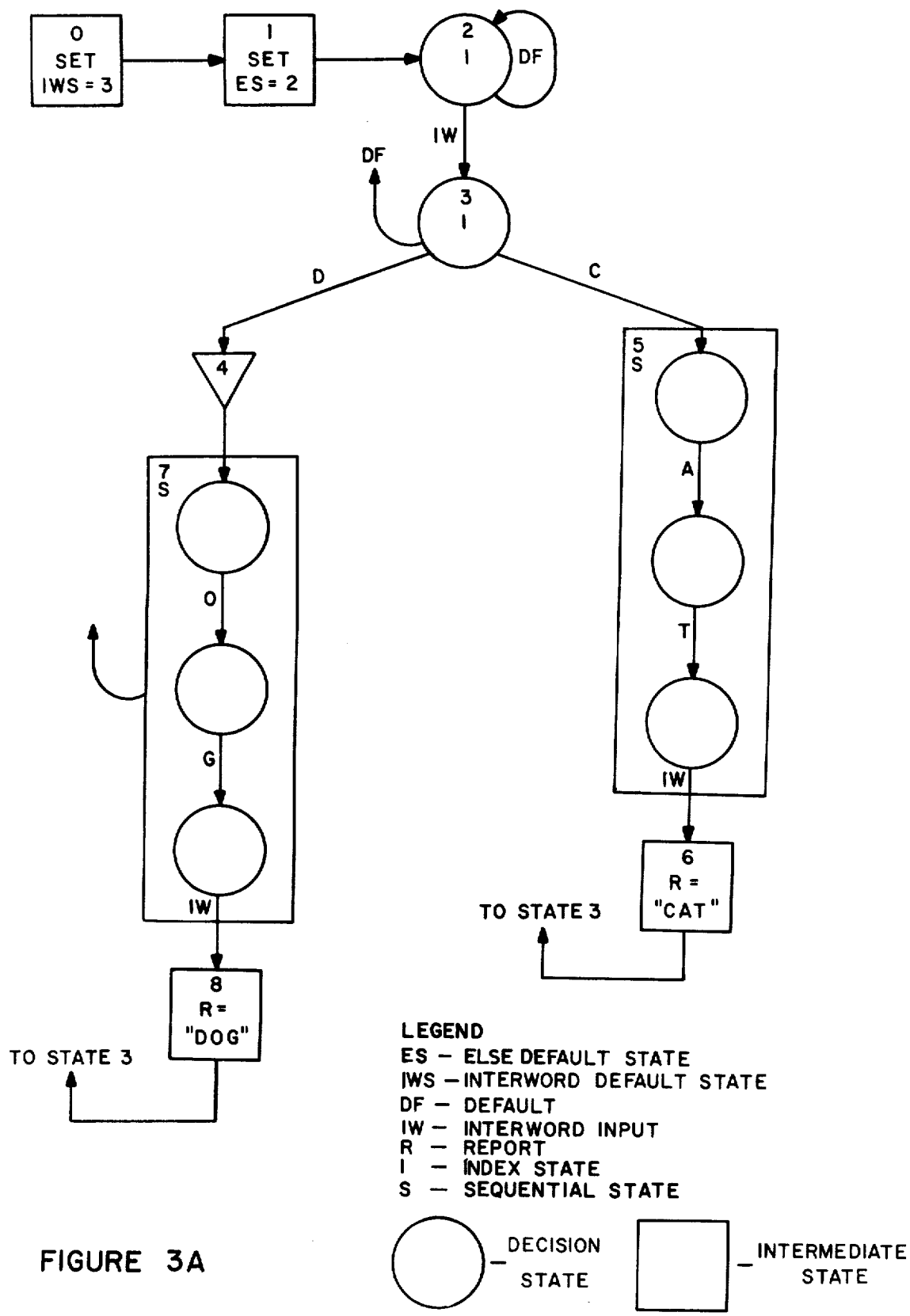

Thus, in FIG. 3 characters received after either "C " or "D" may be compared within one sequential type state, and the state diagram is then collapsed as shown in FIG. 3A.

State 7 is a sequential state looking for the letters "O" and "G" followed by an interword. If these characters arrive sequentially in the order shown, a transition is made to the next following state, state 8. Again, a default results in a transition to one or the other default states. State 8 is a report state and issues a code unique to the word "DOG". In a similar manner the sequence starting with state 5 results in a "CAT" report. This reduction in the number of states results in a significant saving of control table memory when decisions are required only on a specific sequence of characters; i.e. fewer states are required. In a typical applicaton the collapse may amount to as much as 4 to 1 in comparison with the use of index states when searching for words without VLDC strings.

Jump State Type

State 4 in FIG. 3A is a "jump" state. Its purpose is merely to establish a new state numbering sequence for the states to follow because the next state (7) is a sequential state, and if it is successful the next following state must be in numerical sequence.

Nibble Definition

In FIG. 4 there are 16 indexing bits in the state word, corresponding to a 4-bit input code. In any practical search system a 4-bit input code would not be sufficient to distinguish the various text characters, in which case the number of indexing bits would normally have to be expanded accordingly. It is possible that the amount of memory necessary to store these additional bits could increase to impractical limits. For example, an 8-bit input code would require 256 indexing bits in each word, which would be far too impractical.

The invention solves this practical problem by breaking up each incoming code into parts called "nibbles", and typically providing an index state for each nibble. In a typical implementation of a text search device, the input character code is 8 bits. This code is broken into two 4-bit nibbles, which require only 16 indexing bits for each of two index states. Similarly in the implementation of FSA D, described later herein, the input code is 16 bits, which is broken into four 4-bit nibbles. The nibbles are then presented to the FSA in sequence.

Figure 5:
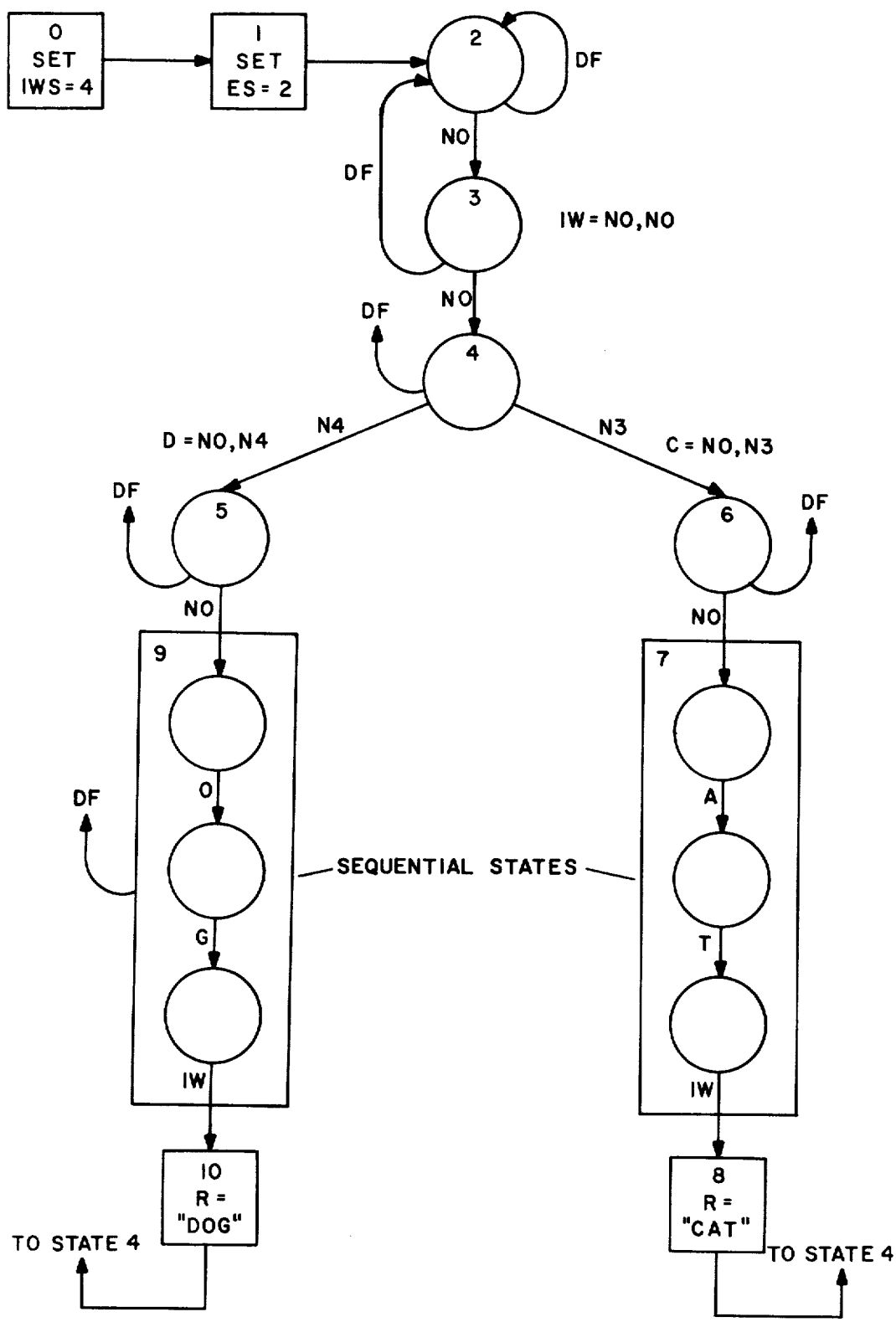

When nibbles are used, the index state of FIG. 3 cannot uniquely operate on full characters. Instead, the state diagram of FIG. 5 results. Each character is coded into two nibbles. For example the nibble values for an interword are designated as N0 and N0, shown N0,N0. The two nibble code for D is N0,N4, etc.

At state 4, only the least significant nibble of the first incoming character is examined. At either state 5 or 6 the second nibble is examined. After either state 5 or 6, a sequential state can be used to examine the next two full characters plus interword. However, even then, the characters may be broken up into nibbles for convenience in actual implementation; but each sequential state, utilizing all 32 bits of segments 1 and 2 of the state word, can represent the four nibbles of both characters; and, indeed, up to eight nibbles of 4 characters can be represented.

In the example illustrations to follow a simplification is made such as to imply that full characters are being processed at each decision state, rather than nibbles. This is a simplification, only, for clarity in presenting concepts unrelated to the nibble concept; each such concept is readily extended to nibble processing.

Figure 4A:
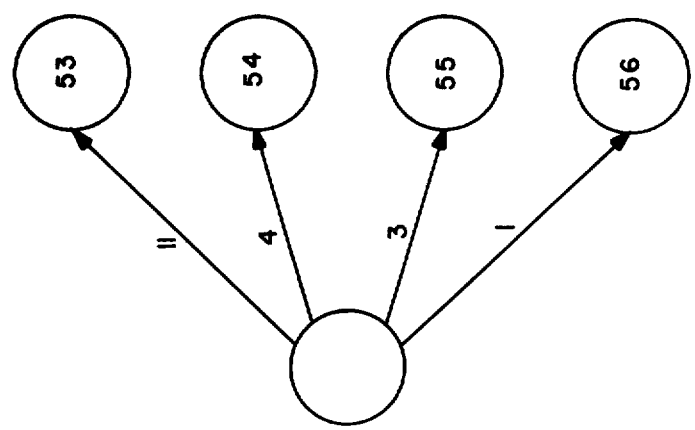

Indexing Example:

Although the indexing method is the subject of a companion disclosure (reference 4), its use in this invention is a key feature, and the example shown in FIG. 4A is presented for clarification. Four indexing bits are shown to be set (equal to one), one each corresponding to input nibble codes 1, 3, 4, and 11. The base state number is assumed equal to 53. The possible success states are then 53, 54, 55, and 56, and are associated with the four possible success codes as shown.

Assuming that the input code corresponds to a receipt of the code number 3, there are exactly two indexing bits set to the left of the indexing bit corresponding to the number 3; thus the index number is two. This index is added to the base state number to identify the next state, i.e. 55.

Try-Again Index State:

In the normal index state a default at any point completes the processing of a full input character, not just one nibble. In such an instance the rest of the term detector presents an entire new character to the FSA for processing starting at the default state. In a try-again index state a new character is not presented to the FSA; instead, the same character which resulted in the default is processed again starting at the default state.

The purpose of the try-again index state and its specific use are described in a later section.

Figure 6:
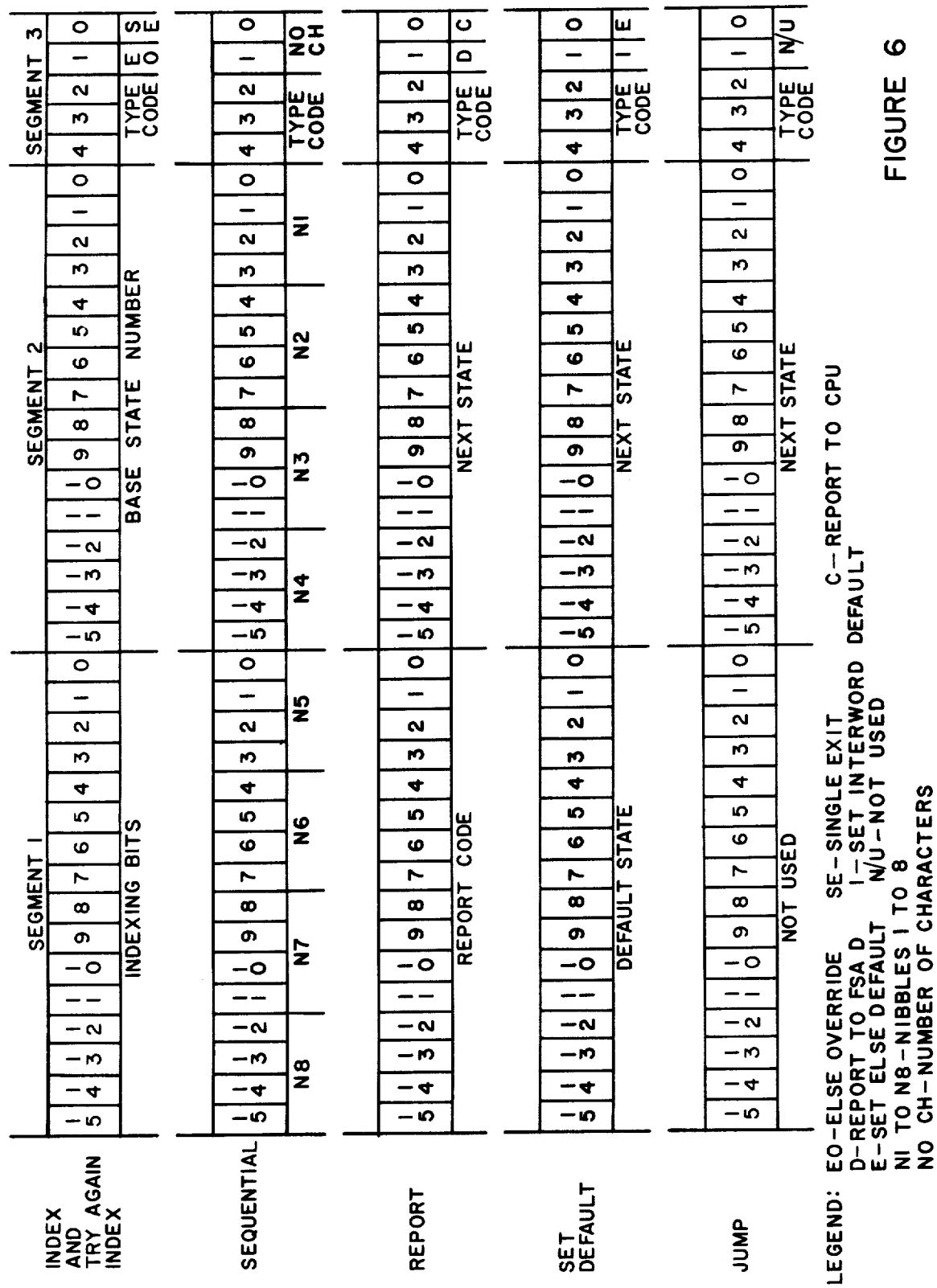

State Word Formats:

FIG. 6 shows the formats for the state words stored in the state control table memory for each of the state types. All of the words are in three segments, the first two of 16 bits each, and the third of 5 bits.

As previously described, segment 1 for the index and try-again index states contains the indexing bits, against which a compare is made with the incoming nibble, and which are used in creating the index. Segment 2 is the base state number to which the index is added to produce the identity of the next state. Segment 3 contains the type code plus two additional control bits which are described later. They are the "else override", and the "single exit" bits.

The state word for a sequential state contains up to four complete character codes (eight nibble codes) in segments 1 and 2 against which sequential compares are made. The sequential state may use one, two, three, or all four of these character codes; therefore there are two bits in segment 3 which determine how many characters will actually be used.

The report state format contains the report code in segment 1, and the next state identity in segment 2. Two control bits are in segment 3 to designate either the CPU or FSA D (or both) as the receiver of the report code.

The change default state has the default state identity in segment 1. This becomes the identity of either the interword default state or the else default state depending upon the setting of the I and/or E bits in segment 3.

The jump state format merely contains the next state identity in segment 2.

It should be pointed out that typically the state register, and all sources for the numbers presented to the state register, are 16 bits in length. This allows up to 65,536 possible states, which appears to be sufficient for most foreseeable applications. However, such a limitation is not inherent in the invention.

Figure 7:
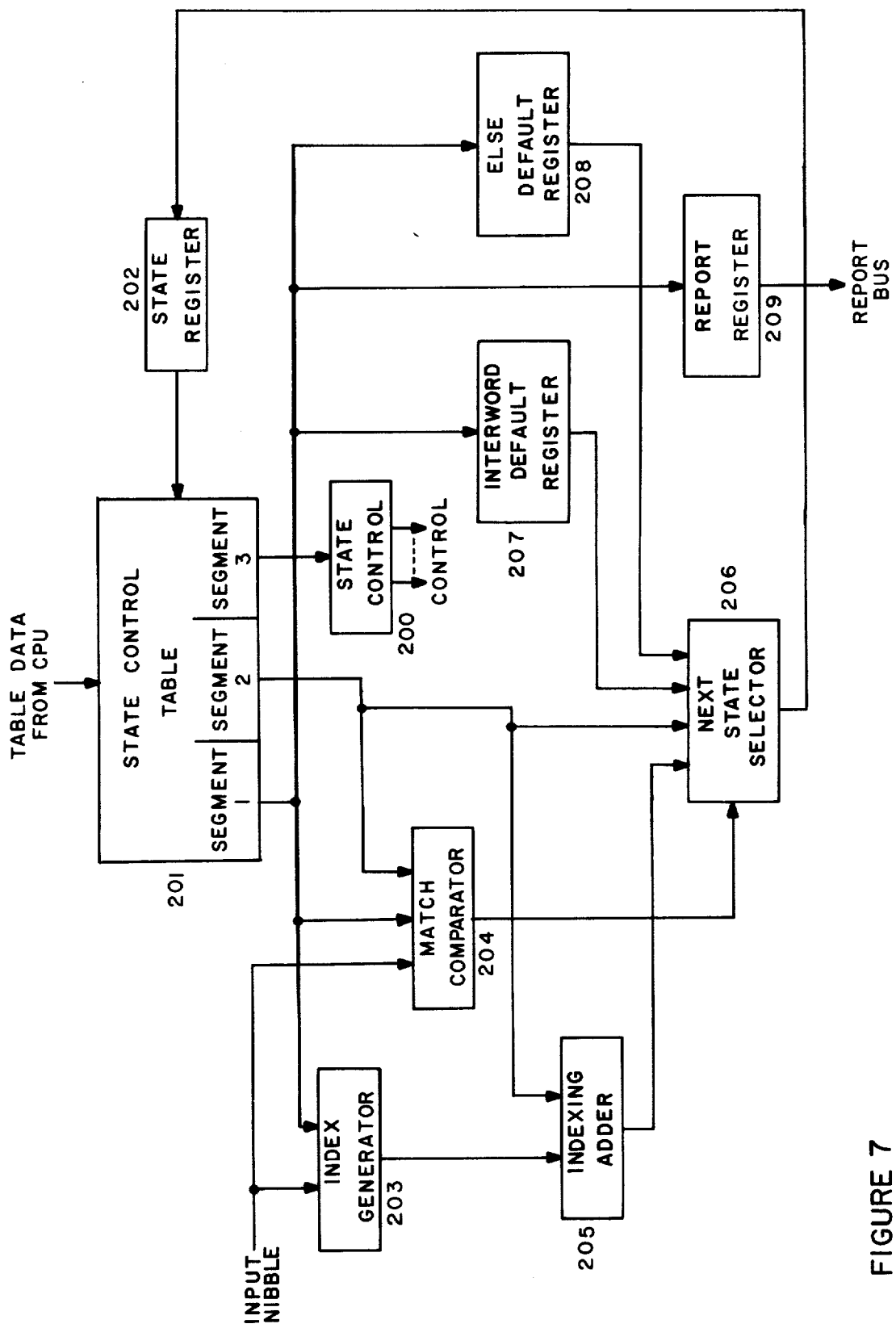
Figure 8:
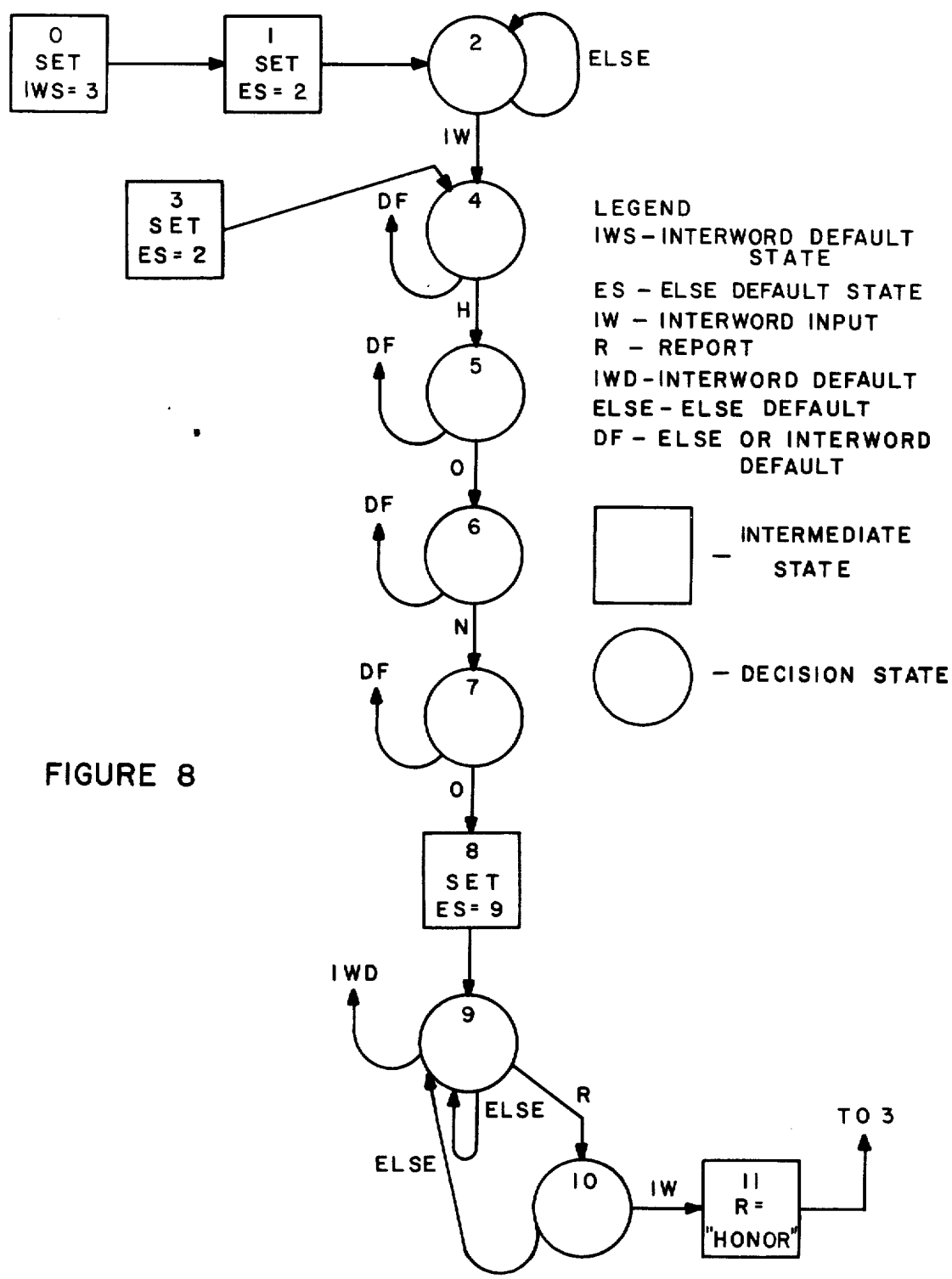

FSA IMPLEMENTATION:

FIG. 7 is a block diagram of one possible embodiment of an FSA device to accomplish the tasks previously described.

The state control table memory 201 comprises a series of state words of any feasible number, each typically comprising 37 bits formated as shown in FIG. 6 for the six state types. A state register 202 is, in effect, the address register for the memory, and contains the value of the present state at any given instant. The output of the memory is then the state word for that state.

Five control signals, supplied from the state word, control the actions of the other elements of the device; and data, also supplied from the state word, are used in various ways depending upon the state type. Three of the said control signals are used to indicate the state type. The other two have different purposes depending upon the state type as shown in FIG. 6.

The incoming nibble, presented to the FSA from external circuits within the term detector, enters as four on/off signals and is presented to the index generator 203 and the match comparator 204.

The match comparator 204 has two modes of operation, one for an index or try-again index state, and one for a sequential state. In either of the index states the incoming nibble selects one of the indexing bits; if that bit is a one a match is indicated; a zero is a default. In a sequential state the nibble is directly compared for a match against a 4-bit portion of one of the characters stored in the state word, selected by other control circuits not shown.

During an index state or a try-again index state, the index generator calculates an index based upon the value of the incoming nibble and the indexing bits from the state word. The index value is then added to the base state value from the state word by means of an adder 205 to become a potential next state value.

If a match occurs the potential next state value is selected by the next state selector 206 for presentation to the state register 202. If there is no match, the next state selector will choose the next state value from either the interword default register 207 or the else default register 208 depending upon whether the incoming character is an interword character or not.

If a try-again index state defaults, the control circuits of the FSA fail to indicate to the rest of the term detector that it has completed its operation, and the processing continues from the default state starting with the first nibble of the same character which caused the original default.

During a sequential state, a direct comparison is made by the comparator 204 between the incoming nibbles and successive nibbles stored within the state word. If all nibbles within the state word compare with a sequence of incoming nibbles, the state register is incremented by one and the next state is taken in sequence. If any nibble does not compare, the next state selector 206 chooses either the interword 207 or else 208 default register contents, which are then placed in the state register 202.

During all three intermediate states (jump, change default, and report states) the next state selector 206 chooses the next state value from segment 2 of the state word. In addition, during a change default state, the new default state value in segment 1 is transferred to either the interword 207 or else default 208 register, or both, as selected by control bits from segment 3 of the state word. During a report state the report value in segment 1 is transferred from the state word to the output report register 209, and is presented to the output report bus for use by the rest of the term detector.

STATE SEQUENCE INVOLVING DON'T-CARE CHARACTER STRINGS:

The state diagram of FIG. 3, as described previously, illustrates the mechanism for detecting a multiplicity of specific words, which may differ in length. However, because of the nature of languages, it is frequently desirable to detect words differing in either prefix or suffix but with common stems, or, more generally, different words with common identical strings. In such instances the different words may be represented by a single word with "variable-length-don't-care" (VLDC) character strings, or with individual "fixed-length-don't-care" (FLDC) characters as part of the word.

FIG. 3 illustrates an extension of the basic FSA concept, involving the change default state, to be able to search for a word containing an embedded VLDC string. That technique is typically useful for detecting different possible spellings of the same word, such as HONOR and HONOUR, as here illustrated. (Character processing, rather than nibble processing, is shown for clarity of illustration).

Of special interest is state 8 which sets the else default identity equal to 9 such that any else default later in the sequence will return to state 9 to await either the letter "R" or an interword character. A letter "R" continues the sequence to state 10, whence an interword completes the sequence to report state 11. When there is an else default at states 9 or 10, a return is made to state 9 and that cycle may be repeated indefinitely as characters of the don't care string arrive; ultimate arrival of an "R" followed by an interword successfully completes the sequence. Only an interword without the "R" is a default back to the originally set interword default state 3.

Although it is true that in this example any word beginning with the string HONO and ending with "R" would produce an output report, not just HONOR or HONOUR, the practical possibility of such a spurious result does not materially detract from the usefulness of this feature of the invention.

Jump States:

FIG. 3 illustrates a further extension of the basic concept, involving "jump" states. This state diagram is designed to detect any word ending in "ED" or any word ending in "AL". (Again, character rather than nibble processing is shown for clarity.)

In the illustration, a jump state allows the FSA to transition from one decision state to another. Such jumps are necessary because it is possible to have received characters causing one state sequence to commence, only to receive a character causing a default of that sequence but commencing a different sequence. Thus it is necessary to jump from one possible sequence to another.

In the example shown the jump states are used to transition from either state sequence (AL or ED) to the other sequence, or to repeat the same sequence, when the specific sequence is terminated by a character abortive of that sequence, but one which begins the same or the other sequence. As can be seen states 5 and 7 are used to jump to the opposite sequence when the first letter of the other sequence is encountered. Similarly, states 10 and 14 result from an abortion of each sequence when the first letter of the other sequence is encountered. States 11 and 13 are also abortive jump states, but result in a restart of the same sequence.

Figure 9:
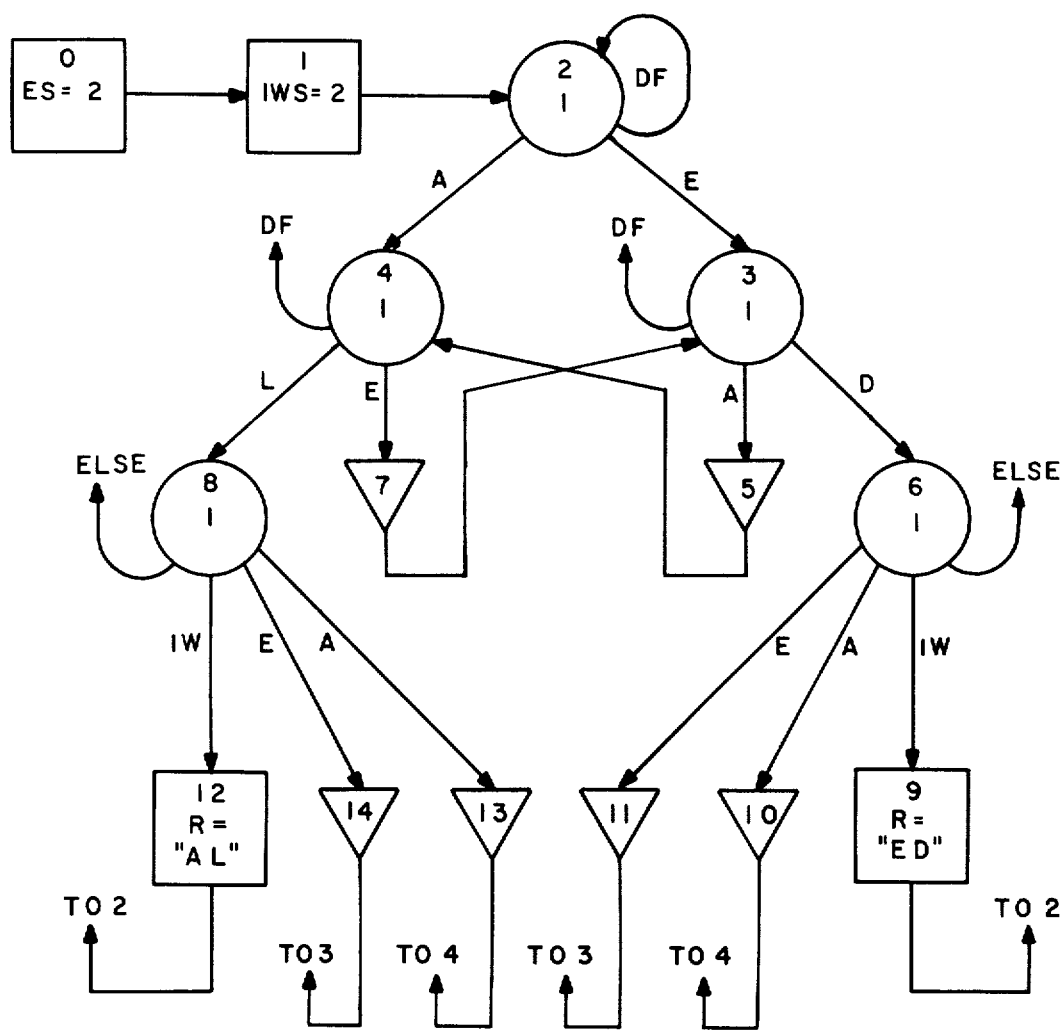
Figure 9:
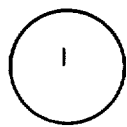
Figure 9:
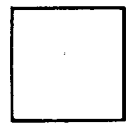
Figure 9:

Try-Again Index States:

In order to conserve FSA control table memory space it is desirable to eliminate as many of the jump states in FIG. 9 as is possible. FIG. 10 is an illustration of the extension of the basic FSA concept by use of the "try-again" index state to reduce the number of jump states. The purpose of this state diagram is the same as that of FIG. 9, i.e. to find all words ending in either "ED" or "AL". (As before, character processing, rather than nibble processing is shown.)

The decision states 3, 4, 5, and 7 are try-again index states. If any one of them defaults, an automatic return is made to the default state 2, and another match test is made on the same full input character, not just a nibble, that caused the original default. This type of operation differs from an ordinary index state, where a default always signals a request for a new input character before any other decision state is completed.

A comparison of the number of states in FIGS. 9 and 10 shows about a 40% saving for this example; normally the saving is not that great, but is still significant.

Figure 11:
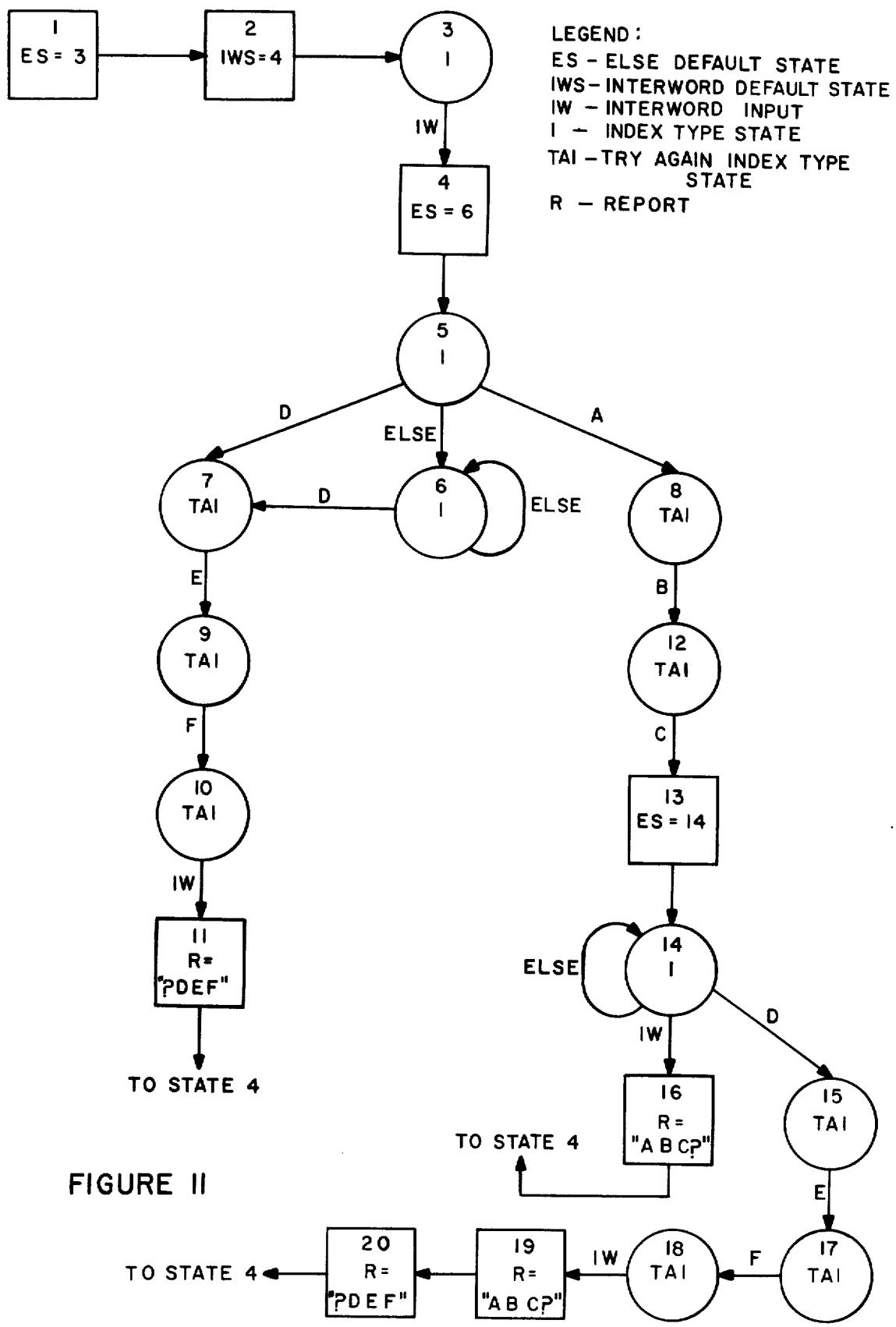

THE USE OF MULTIPLE FSA's:

FIG. 11 illustrates a condition which can occur when control tables are set to search for mixed trailing and leading VLDC terms simultaneously. In the sample the tables are set to search for the two terms: "ABC?", and "?DEF", where the "?" implies a VLDC string. (As stated earlier, character rather than nibble processing is shown.)

Starting at state 1, the else default state is set to 3, and at state 2 the interword default state is set to 4. State 3 is a decision state that is looking for only one input: an interword; any other input is an else default to the same state 3. When an interword comes in, state 4 changes the else default state to 6.

At state 5 four possible branches can be made:
° —a letter "A" input branches to a sequence beginning with state 3,
° —a letter "D" branches to state 7,
° —an interword causes an interword default to state 4,
° —any other character causes an else default to state 6.

At state 6 a "D" input transitions to state 7, while any other input is the same default condition as above. Thus any number of input characters (except "D" or an interword) will cause state 6 to default to itself; this condition takes care of any possible leading VLDC string.

The sequence 7, 9, 10, and 11 is straightforward; a character sequence of "DEF" successfully completes the state sequence. However, if there is an else default at any of the try-again index states (7, 9, or 10), a return is made to state 6, and the input code causing the default is matched against a letter "D" for possible restart of the sequence. As before, any interword default causes a transition to state 4.

The branch beginning with state 8 is straightforward up to state 13. This state changes the else default state to 14 so that an else default after that causes state 14 to be repeated. Such an operation satisfies any trailing VLDC string at the end of "ABC".

However, a leading VLDC followed by "DEF" is also still a possibility; therefore a possible branch can be made to state 15. The sequence starting with 15 is very similar to the sequence starting with state 7; in fact it can be said to be a duplicate except for having to issue two reports instead of just one.

This duplication can become expensive of FSA control table memory when multiple combinations of trailing and leading VLDC's are combined, so much so that it is sometimes economic to separate the leading and trailing VLDC terms into two different FSA's, at least to the extent that they do not appear in the same terms.

Figure 12:
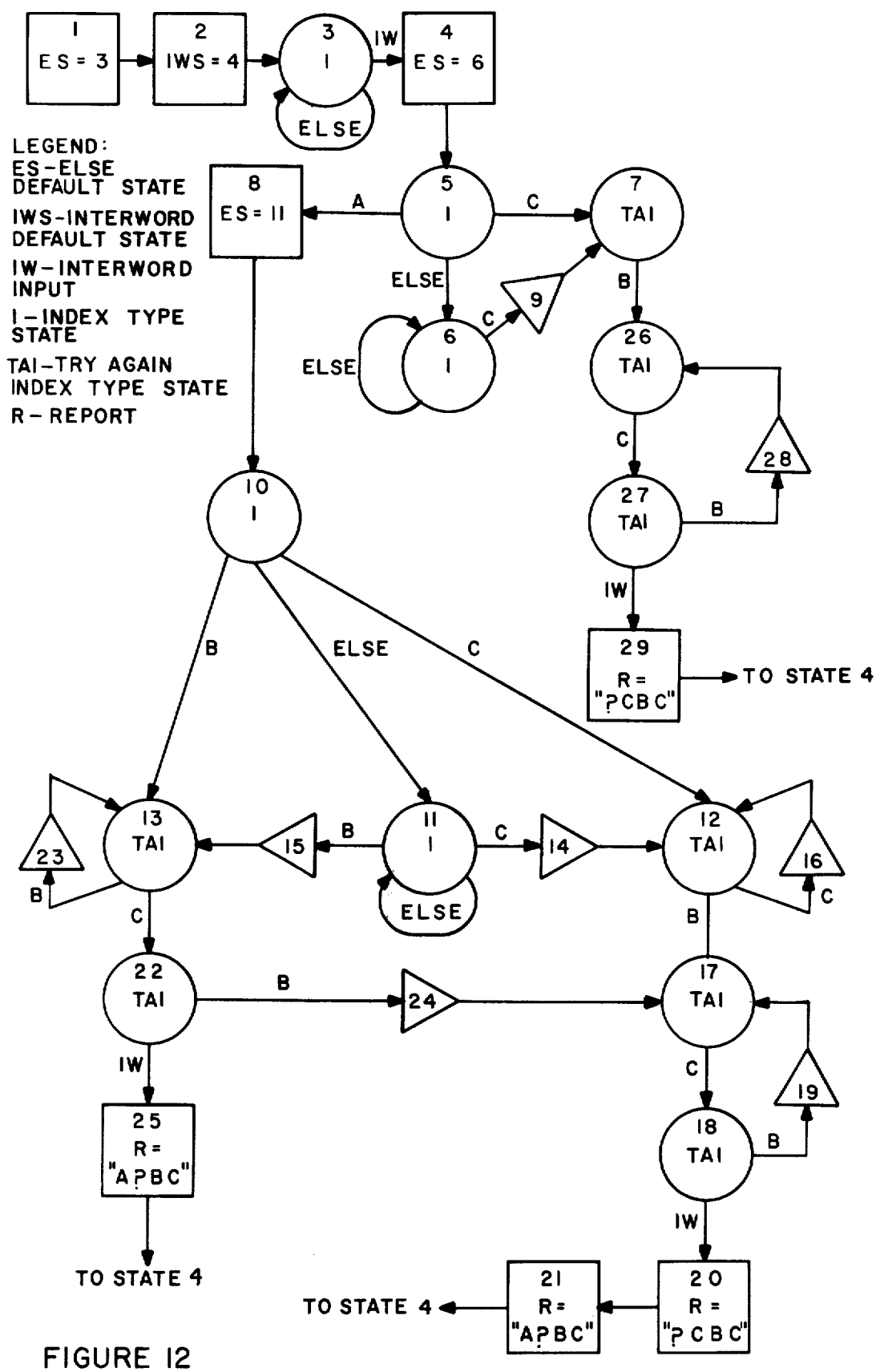

In a similar manner it is sometimes economic to separate leading and embedded VLDC terms into different FSA's. In FIG. 12, for example, it is desired to search for the terms "A?BC" and "?CBC". The following is a detailed description of this rather complex state diagram:

States 1 and 2 set the two default state identities. State 3 awaits an interword, which causes a transition to state 4 where the else default state identity is set to 6. At state 5 there are two possible success transitions as shown; an else default is state 6, and an interword default is state 4.

State 7 is reached if a "C" is received preceded by any number of other characters. Then if "BC" plus an interword are received, state 29 issues a report for "?CBC". At state 27 a "CBC" has been received. If another "B" is received, the successful completion of the sequence is still a possibility because the string "CBCB" has been received. The first "CB" of this string could be part of a leading VLDC string. Therefore at state 27 the receipt of a "B" causes a transition through state 28 back to state 26.

At state 8, an "A" has been received, and the else default is set to 11 to take care of any possible VLDC characters following the "A". At state 10 there are three possible successes, "B" and "C", plus all other characters (VLDC's). The else override is used for these other characters to transition to state 11, although a normal default would accomplish the same thing. Now since the else default was set to 11 at state 8, state 11 will be repeated for any character except "B", "C", and an interword.

State 12 will have been reached if the string "A?C" is received. Thus there is a possibility for the success "?CBC", and the states 12, 16, 17, 18, 19, and 20 are similar in form to the previously described sequence starting at state 7. However, in addition, since an "A" started the sequence of characters following the last interword, the string "A?BC" has also been received, and a second report must be issued at state 21.

State 13 will have been reached for an "A" followed by a "B", with any numbr of intervening characters. A "C" then causes a transition to state 22, and an interword then results in a success. However, at state 22 if a "B" is received, there is a possibility of the sequence "A?CBC", which would satisfy both possible query terms. Therefore a jump is made to state 17 to try to complete that sequence.

Figure 13:
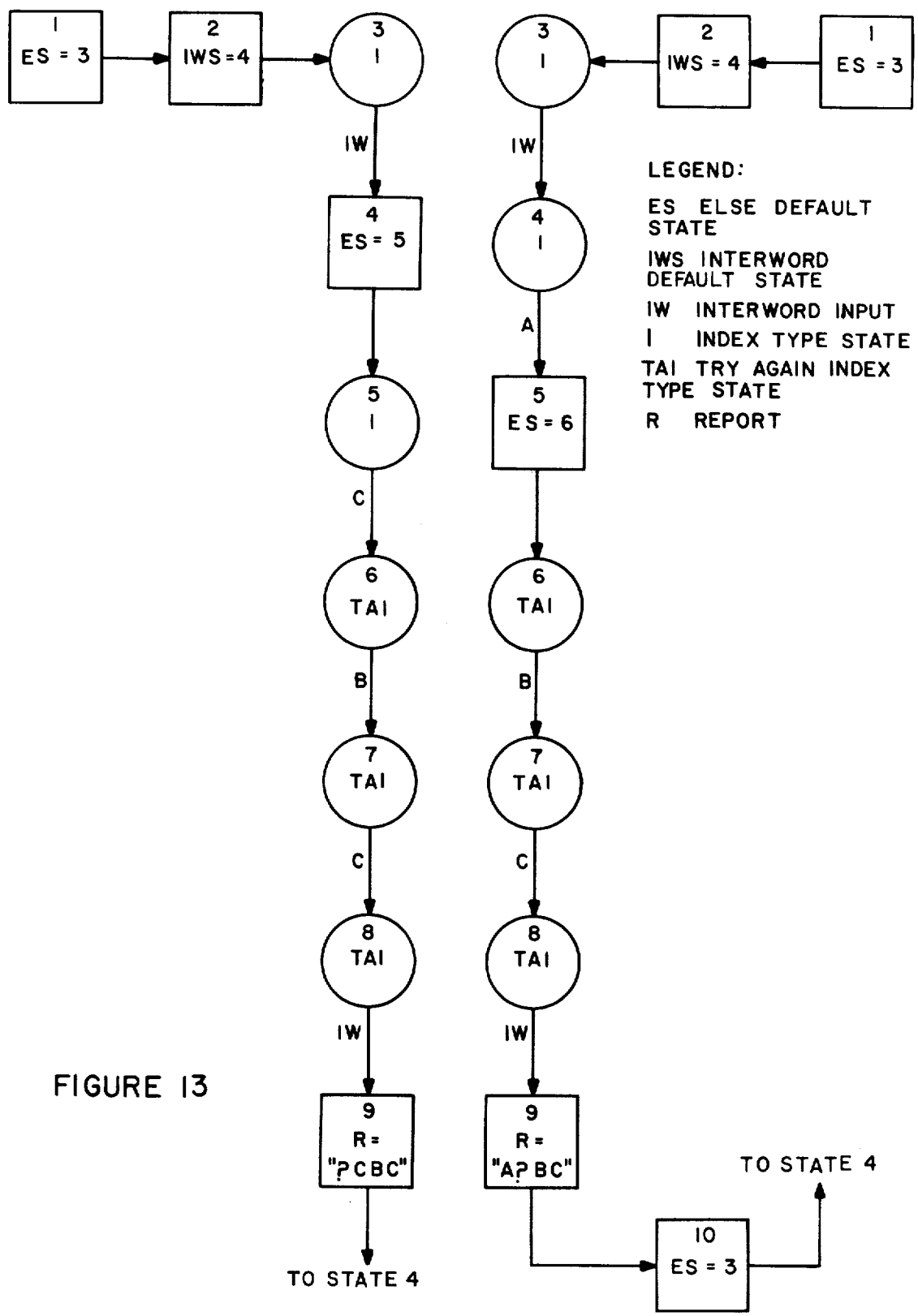

FIG. 13 shows two separate state diagrams, one for each of the two query terms required in FIG. 12. Both of them are straightforward, and make use of the change else default state for accounting for VLDC strings. In FIG. 13 it is assumed that the two strings are handled by two different FSA's, such that each one does not have to account for the other possibility. A total of 19 states are used (again not considering the use of nibbles which would increase the number by a small amount). In contrast the state diagram of FIG. 12 uses 29, over 50 percent more. When other possible VLDC query terms are considered, the savings are even greater when leading and embedded VLDC terms are separated into different FSA's.

The following table illustrates the saving in memory which actually occurs as the number of combined leading and embedded VLDC terms are separated into two different FSA's, rather than in the same FSA.

| No. of Leading VLDC Terms (4 char. plus VLDC) | No. of Embedded VLDC Terms (5 char. plus VLDC) | FSA States w/ Leading VLDCs Only | FSA States w/ Embedded VLDCS Only | FSA States w/ Combined Leading and Embedded VLDCs |
|---|---|---|---|---|
| 30 | 30 | 300 | 360 | 64,000 |
| 45 | 45 | 450 | 540 | 131,000 |
| 60 | 60 | 600 | 720 | 223,000 |
| 75 | 75 | 750 | 900 | 1,272,000 |

In summary, then, when large numbers of mixed leading, embedded, and trailing VLDC terms are considered, it becomes economic to separate these three functions into three separate FSA's operating in parallel. The one assigned to trailing VLDC terms can also be used to handle ordinary terms, and/or terms with FLDC characters without equivalent "memory explosion". The three separate FSA's are called A, B, and C in FIG. 1.

Since all three FSA's are interchangeable, if the queries are such that the control table for one of the FSA's would overflow the memory of that FSA, the overflow may be transferred to another, providing that the interaction with the terms of the other FSA are considered in the translation.

NUMERICAL RANGING:

It is clear that the basic concept as described heretofore can be used to search stored data for specific numerical values, as long as the numeric data are coded within the same scheme as the alphabetic data.

In addition, the basic concept may be expanded through simple additional features to search the data base for numeric data falling within a numeric range specified by a user query.

There are two such additional features: the "else override", and the "single exit" features of the index and try-again index states.

Else Override:

The else override feature involves a control bit within the state word of an index state, designated "EO" in FIGS. 4 and 6. When this bit is on during any index state and there is an else default, the default is essentially overridden and a transition is made to a success state assigned to the else condition. In other words, the EO bit within the state word is considered as another indexing bit, and enters into the index number calculations.

Single Exit:

Still another control bit within the index state word, "SE" in FIGS. 4 and 6, is used to define a single exit action. In essence this action inhibits the creation of the index, such that if there is a successful match on any indexing bit, a transition is made to the state specified by the base state number stored in the state word, regardless of which indexing bit was matched. This includes the EO bit; i.e. if the EO bit were on an else default would transition to the base state.

Figure 14:
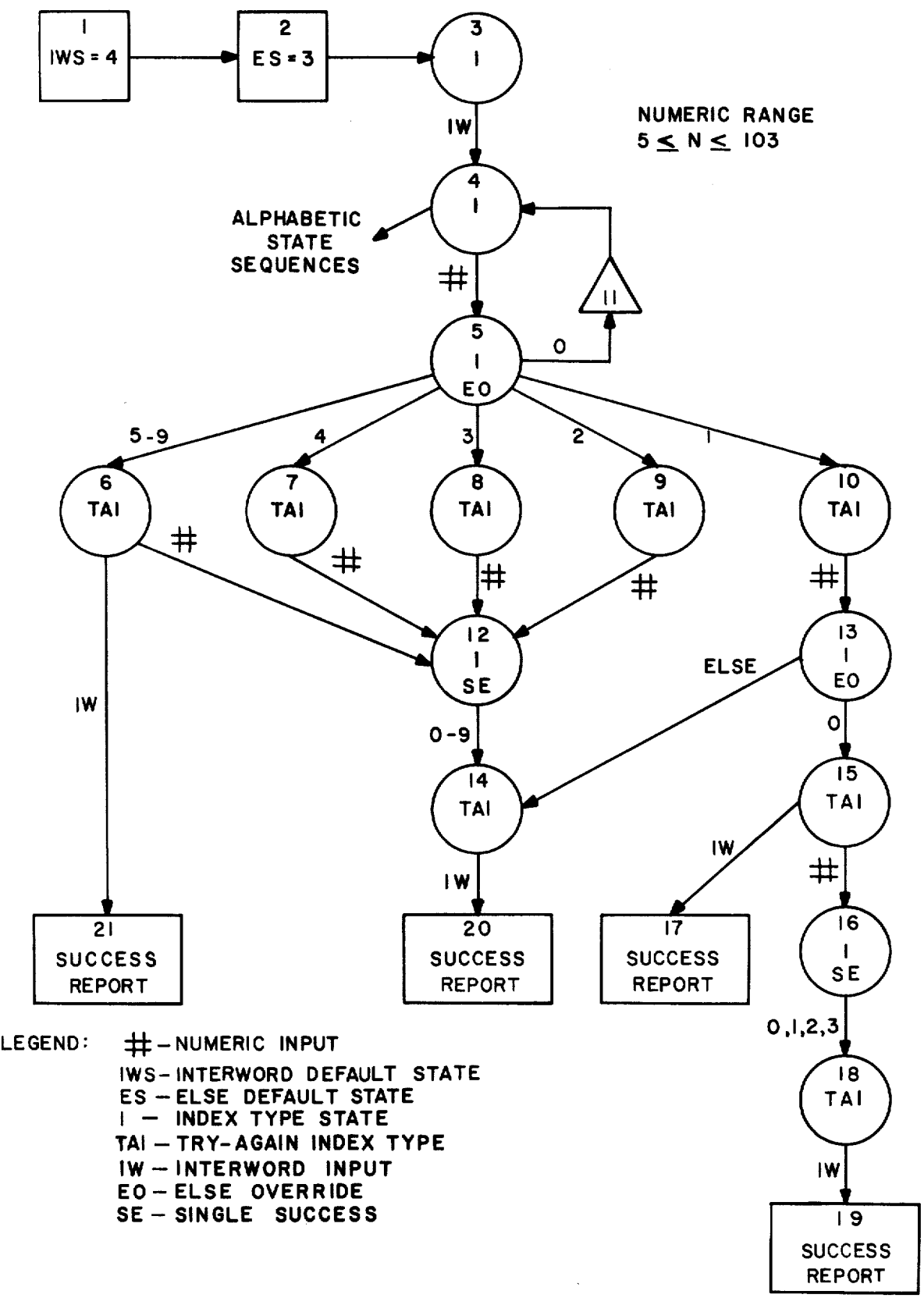

Description of Numeric Range Operation:

FIG. 14 is a state diagram demonstrating typical FSA action when it is trying to determine if numeric input values are within a specified numeric range. The range from 5 to 103 inclusive is assumed for illustration.

The diagram of FIG. 14 is designed around the use of nibbles rather than full characters, since numeric range searching is particularly enhanced by the used of nibbles.

States 1 and 2 set up the interword and else default states as in foregoing examples, and state 3 awaits an interword. State 4 awaits the first nibble of the first text character. By means of unique character encoding, state 4 can uniquely distinguish between numeric and non-numeric characters by examining only the first nibble. If a character is found to be alphabetic a transition is typically made to a state sequence of a type previously described, as indicated schematically in FIG. 14. When an input character is found with the first nibble indicating a numeric, as indicated on the diagram by the mark "", a success transition is made to state 5 for examination of the second nibble, which uniquely determines which numeric it is.

State 5 is typically an ordinary index state, having a base state number 6, and having the six possible success states numbered sequentially 6 through 11, as indicated. The EO (else override) bit of state 5 is set and therefore acts as an indexing bit and directs the transition to state 6 in presence of an else default. The regular indexing bits corresponding to the input numerics 0 through 4 are also set, and control the success transition for those input values in essentially the manner already described with reference to alphabetics. The regular indexing bits for the input numerics 5 through 9 are not set, causing those input values to be treated as else defaults, subject to else override control.

State 10 is reached if the first character is a "1", and the sequence is continued at state 13 if the second character is also numeric. State 13, using the EO bit, branches in one of two directions: to state 15 for a zero and to state 14 for everything else.

Recapitulating, it can be seen that state 14 will be reached only if two numeric characters have been received, and they consist of any one of the possible numeric pairs other than the characters "10". State 15 will be reached for the characters "10", and state 21 will be reached for a single character between 5 and 9, inclusive. An interword at state 14 represents a success (the received value is within range) as does the interword at states 6 and 15. Thus, success reports are issued at states 17, 20 and 21.

State 16 represents a condition where the first two characters were "10" followed by a third numeric. If that numeric is 0, 1, 2, or 3, as determined by state 16 using a single exit action, a transition is made to state 18. (All other characters cause a default.) At state 18 if the next character is an interword, a success report is issued at state 19.

Throughout this entire state diagram the normal default operation occurs if the received character does not correspond to the required success transitions. Explicit representation of those default transistions is omitted for clarity of illustration.

SEQUENTIAL WORD PHRASES:

A sequential word phrase (SWP) is a group of two or more sequential words of text. Normally they have a linguistic significance similar to a single word, although this is not a necessity. An example is "UNITED STATES OF AMERICA".

The FSA concept can be adapted to search for SWP's; however, the adaptation is more extensive than the individual extensions previously described, and an FSA as described previously cannot be used for SWP's directly, nor vice versa. In FIG. 1 FSA D is used for SWP's.

There are two significant aspects of FSA use for SWP's: First, input codes represent full words, presented by the other FSA's only when interword characters are received, and there can be a plurality of such codes presented at a given interword; second, the FSA must have the capability to process a plurality of SWP's against the same input codes.

To illustrate these two aspects, assume that two different users entered different queries; the first contains the phrase "UNITED STATES OF AMERICA", and the second, "U? S? OF A?", where "?" represents a VLDC. It is clear that if the words "UNITED STATES OF AMERICA" occurred in the text, it would satisfy both queries. At each successive interword, two reports would be presented to FSA D, one for each query. Furthermore, the FSA would have to process two SWP's at each interword.

Figure 15:
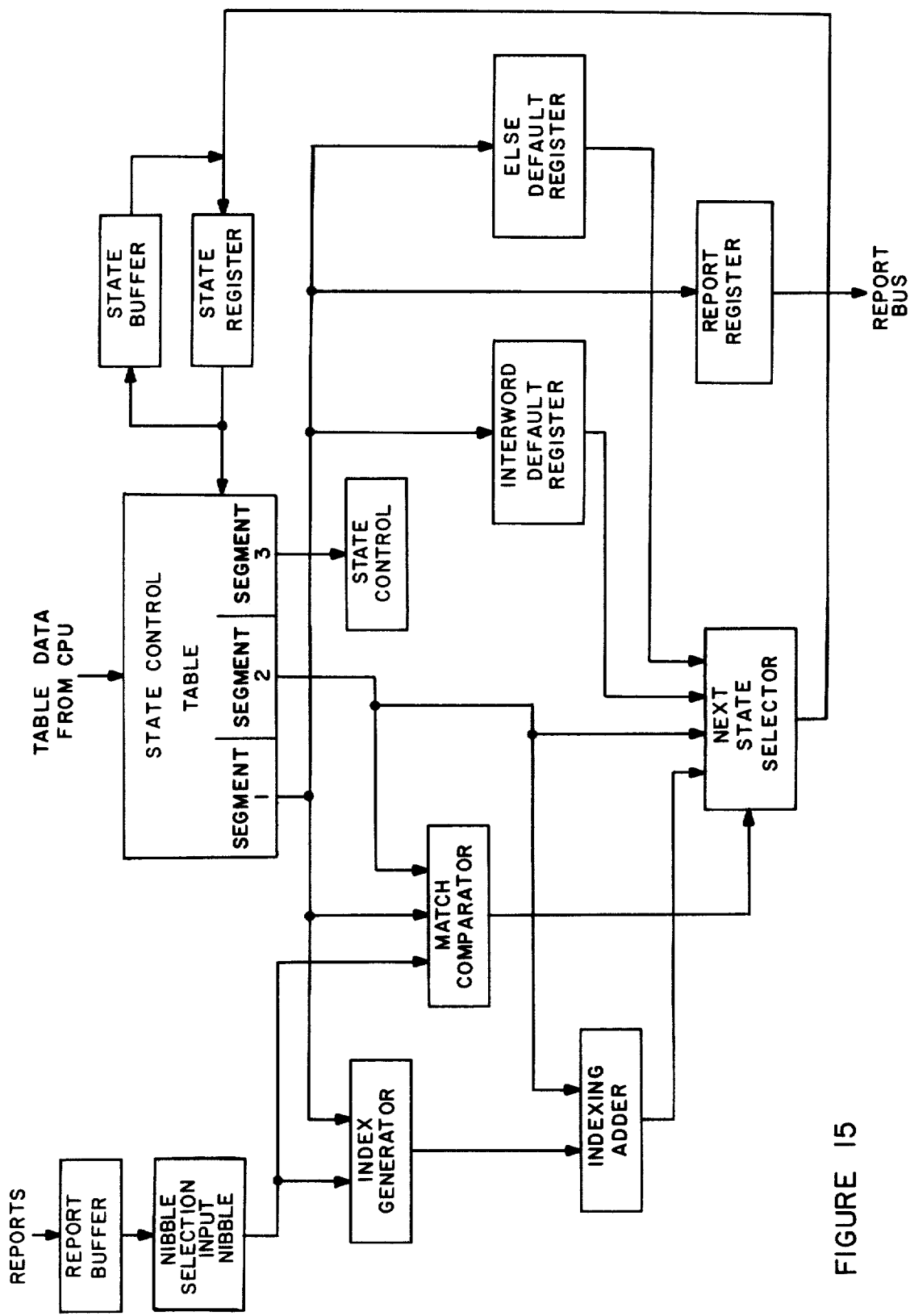

Implementation for SWP's:

FIG. 15 is a block diagram of FSA D, showing two additional features added to the basic FSA block diagram shown in FIG. 7. These two features are: a multiple word input buffer for accepting the plurality of input reports possible at each interword, and a state buffer used to store the latest success state of all active state sequences associated with the plurality of SWP's.

As word reports are generated by the other FSA's at each interword, the reports are stored as received in the input buffer, to await processing. When all such reports are received at a given interword, FSA hardware similar to that described for FIG. 7 is used in a time-shared manner to process each report in sequence. This processing is in two phases:

First, each report, in turn, is considered as a possible start of a SWP, such that the state diagram represented by the control tables is started from the beginning, (i.e. the state register is cleared) with each such report presented as an input. After all 4 nibbles of a given report are processed, if no default has occurred, the latest success state of the FSA will be stored in the state buffer, and the next report is processed from the beginning of the state diagram in the same way, etc., until all reports are processed. A default on any input report merely causes the next report to be processed, without a state being recorded. When all reports are processed there may or may not be one or more success states stored in the state buffer from the input reports received at a given interword.

Second, since there could be a plurality of the latest success states from the previous interword already stored in the state buffer, each such state is recalled from the state buffer and the FSA restarted from that state with each of the input reports; i.e. all active state sequences are continued against all new reports.

Thus, at any given instant, there may or may not be a plurality of SWP's, represented by one or more latest success states of active sequences stored in the state buffer. As successive reports arrive, each sequence will either default against all of the reports at a given interword, in which case the latest success state of the sequence is cleared from the state buffer, or it will continue to be active against one or more reports until it reaches its logical conclusion. At this time a report will be issued by the FSA indicating a successful search for a specific SWP. When a report is issued, the sequence is artificially "killed," as it has served its usefulness.

In FIG. 15, control logic, not shown, causes the state buffer to record the latest success from the state register at the end of processing a given input report, providing there has been no default. Further, these latest success states are removed from the state buffer at each interword, and put back into the state register to restart the FSA at that state for processing each report in turn.

Figure 16:
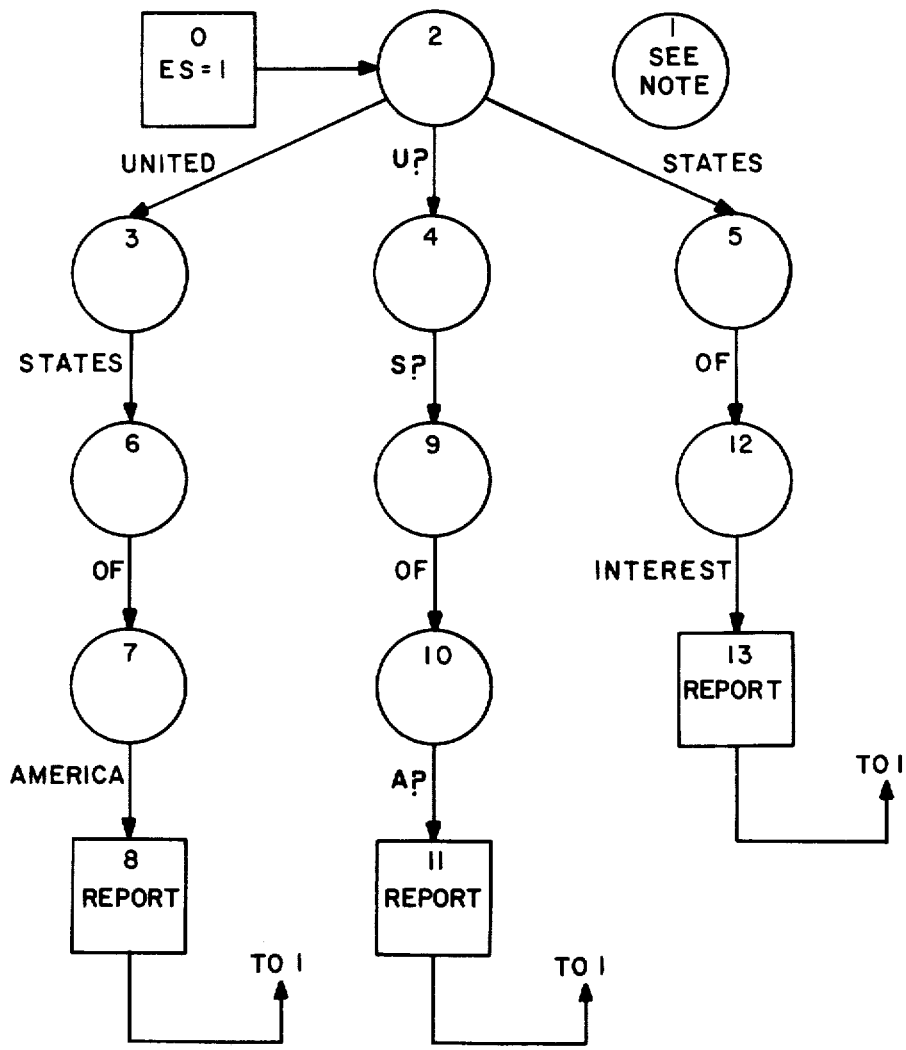

SWP Example:

FIG. 16 is a sample state diagram to illustrate the operation of a SWP FSA. In most characteristics it is similar to most of the diagrams previously shown, the main differences being that transitions are made on complete words, as opposed to characters, and there is no need to identify an interword default state.

The diagram is designed to detect the two SWP's mentioned above, plus the SWP "STATES OF INTEREST". Although an actual state diagram would be oriented around nibbles, as before, a simplification is made to indicate transitions on receipt of words.

Assuming that the text "UNITED STATES OF AMERICA" arrives without anything preceding it, there will be two reports received at the first interword, one for "UNITED" and one for "U?". Each of these reports will be used as an input, with the state diagram starting from state 0 in both cases. Therefore the states 3 and 4 will be stored in the state buffer at the end of the first word.

At the end of the second word, again two reports will be received, one for "STATES," and one for "S?". Each of them will be used as an input, with the state diagram again starting from state 0 in both cases. The report for "S?" will default at state 2; however, the "STATES" input will cause a transition to state 5, which will be stored in the state buffer. There will now be three state identities in the state buffer: 3, 4, and 5.

At this time both states 3 and 4, which were recorded at the previous interword, will be recovered from the state buffer, in turn, and the FSA restarted at these states, with each of the reports used as an input in turn. State 3 will default against the "S?" input but will continue to state 6 on the "STATES" input. State 6 will then be stored in the state buffer. In a similar manner, state 9 will also be stored in the state buffer on continuation from state 4 on the "S?" report. The states then in the state buffer would then be 6, 9, and 5.

Following the same procedures, after the next interword, only the "OF" report would be received, and the three states 7, 10, and 12 would be in the state buffer.

On the next interword two reports would again be received, "AMERICA" and "A?". A transition would be made from state 7 to state 8 on the "AMERICA" input, which would then issue an output report to indicate receipt of the entire SWP. A transition to state 1 would then occur; this is an artificial decision state looking for an impossible input code, causing an automatic default. Thus that sequence would end. In a similar manner state 11 would issue a report, and that sequence would be automatically "killed" at state 1. The third sequence, at state 12, will default against both input reports, leaving no more states stored in the state buffer.

VLDC Word Strings:

It is possible to adapt the SWP FSA to search for SWP's in which there are unknown intervening words between the words in the phrase. In essence the mechanism is the same as that used for detection of variable length don't care (VLDC) characters previously described; the equivalent concept for SWP's is VLDC word strings.

The mechanism previously described is the use of a change default state for re-setting the else default at the location in the state diagram where the VLDC word string occurs. FIG. 3 illustrates the technique as applied to VLDC characters; the technique is similar for VLDC word strings.

We claim:

1. In a finite state automaton (FSA) responsive to a stream of input digital code elements and capable of existing in any one of a plurality of alternative states which include a plurality of decision states, the FSA stepping automatically from each decision state to a next success state or to a next default state in response to a comparison of an input code element and a code value for the existing state; the combination of state word memory means associated with each decision state and containing an identification of a next success state to follow a comparison success, and means external to said memory means and common to a plurality of decision states for identifying a next default state to follow a comparison default.

2. Combination according to claim 1 wherein said input code stream represents text characters and said default state identifying means include two default state registers for separately identifying distinct default states to follow defaults due to input codes representing interword characters and defaults due to input codes representing other characters, means for initially stepping the FSA, independently of said input code elements, through two successive non-decision states to a first decision state, state word memory means associated with each said non-decision state and containing identifications of the respective said distinct default states, and action means controlled by the state word memory means associated with each said non-decision state, when the FSA is in that state, for transferring the default state identification contained in that memory means to the corresponding default state register.

3. Combination according to claim 1 wherein said default state identifying means includes means for separately identifying distinct default states to follow defaults due to input codes representing respective different classes of code element values, and said combination includes means for automatically and selectively altering the identification of either one or both of said distinct default states.

4. Combination according to claim 3 wherein said input code stream represents text characters and said default state identifying means include a first register for containing the identification of a default state to follow defaults due to input code elements representing interword characters and a second register for containing the identification of a default state to follow defaults due to code elements representing other characters.

5. Combination according to claim 1, wherein said next default state identifying means include register means for containing the identification of a next default state which is common to a plurality of decision states, said alternative states include at least one non-decision state, the state word memory means associated with said non-decision state contains the identification of a default state, and said FSA includes action means responsive to the state word memory means associated with said non-decision state for transferring such default state identification to said register means.

6. Combination according to claim 5 wherein said input code stream represents text characters and said register means includes registers for separately identifying distinct default states to follow defaults due to input codes representing interword characters and defaults due to input codes representing other characters.

7. Combination according to claim 6 wherein said action means include means for directing said transfer of default state identification to a selected one of said registers.

8. Combination according to claim 1 wherein said FSA includes action means controlled by the state word memory means associated with each instant state said action means include means for stepping the FSA through a plurality of sequences of decision states in response to successful comparisons of distinct series of input code elements representing respective query terms, each said state sequence terminates in a non-decision report state, the state word memory means associated with each said report state includes a specific code representation of the corresponding query term, and said action means, when under control of the state word memory means associated with a report state, includes means for causing said specific code to be transferred as an output report from the FSA for identifying said corresponding query term.

9. Combination according to claim 1 wherein the state word memory means associated with at least one decision state contains an identification of a substitute next state, and control means settable to cause said FSA to override said default state identifying means and to make transition to said substitute next state following a comparison default.

10. Combination according to claim 1 wherein the state word memory means associated with at least one decision state includes a plurality of indexing bits corresponding to the respective possible values of said input code elements, with set bits designating a plurality of corresponding success states, said FSA, when under control of said state word memory means, including means for making parallel comparison of an input code element with said set indexing bits, and means responsive to the position of a matching bit among the set indexing bits for identifying the success state corresponding to a match, said state word memory means includes a control bit settable to cause said FSA to override said default state identifying means and to make transition following a comparison default to a substitute next state, and said success state identifying means includes means for deriving an identification of said substitute next state from the position of the set control bit among the set indexing bits.

11. Combination according to claim 1 wherein said state word memory means associated with at least one decision state contains a code representation of a selected plurality of code element values, and said FSA includes action means controlled by the state word memory means associated with each instant state, said action means, when under control of the state word memory means associated with said one decision state, includes means for causing the FSA to make transition from said one decision state to a single success state in response to a match between the instant code element value and any one of said selected values.

12. Combination according to claim 1 wherein said state word memory means associated with said one decision state contains an identification of said single success state.

13. Combination according to claim 11 wherein said code representation comprises a plurality of indexing bits corresponding to the respective possible values of said input code elements, with set bits designating the said selected code element values.

14. Combination according to claim 11 wherein said state word memory means associated with said one decision state includes control means settable to cause said FSA action means to override said default state identifying means and to make transition from said one decision state to said single success state following a comparison default.

15. A finite state automaton (FSA) for searching a stream of input digital code elements representing decimal numbers for numbers which are within a specified numerical range, said FSA being capable of existing in any one of a plurality of alternative states which include at least one each of decision states and end states, said FSA including state word memory means associated with each said decision state and including an index bit corresponding to each possible value of the associated digit, with set bits designating the digit values that correspond to numbers within said specified range, action means, responsive to the instant input code element and to the contents of the state word memory means associated with the instant state, for causing the FSA to make success transitions through a sequence of at least one decision state and one end state in response to every series of input code elements representing a number within said specified numerical range, and means for reporting a search success in response to completion of every such sequence.

16. FSA according to claim 15 wherein said action means includes default means normally causing the FSA to make transition from said decision states to an identified default state in response to an input code element having a default value corresponding to an unset index bit, and wherein said state word memory means associated with at least one said decision state
contains an identification of a substitute next state, and
includes a default override control bit settable to cause said action means to override said default means and to cause the FSA to make transition to said substitute next state in response to an input code element having a said default value.

17. FSA according to claim 15 wherein said state word memory means associated with at least one said decision state includes a single exit control bit settable to cause the FSA to make transition to a single identified success state in response to any input code element having a value corresponding to a set index bit.

18. Combination according to claim 17 wherein said state word memory means includes a default override control bit settable to cause said FSA to make transition from said one decision state to said single success state in response to any input code element having a value corresponding to an unset index bit.

19. A finite state automaton (FSA) for searching a stream of input digital code elements to detect a series of code element values of interest, which series includes a first sequence of one or more specified values, an embedded variable length string of don't care values and a following sequence of one or more specified values; said FSA being capable of existing in any one of a plurality of alternative states each of which is associated with a state word memory and which include a plurality of decision states; said FSA including action means controlled successively by the state word memory associated with the instant state for causing the FSA to step through a sequence of states, making transition from each decision state to a next success state or to a next default state in response to a comparison of an input code element and one or more code element values associated with the existing state; further characterized in that said FSA includes a default state register containing an identification of a next default state for subsequent decision states, and means for initially transferring to the default state register an identification of the decision state associated with the first value of said initial sequence, said states include a plurality of change default states, and said action means, when under control of the state word memory associated with a change default state, includes means for transferring to the default state register an identification of a selected default state, and means for stepping the FSA to a selected next state;

said next state and next success states being such that, in response to input code elements representing said series of values, the FSA steps successively through states which include an initial sequence of one or more decision states associated with the specified values of said initial sequence, a first change default state, a following state sequence of one or more decision states associated with the specified values of said following sequence, and a second change default state;

and said action means, when under control of the respective state word memories associated with said first and second change default states, comprise means for transferring to the default state register identifications of the decision states associated, respectively, with the first value of said following sequence and with the first value of said initial sequence.

20. FSA according to claim 19 or 21 wherein said action means includes means for inhibiting presentation of a next input code element accompanying a default transition from a decision state of said following state sequence.

21. FSA according to claim 8 wherein
said input code elements represent groups of word-forming characters delimited by interword characters, said initial sequence of one or more specified values represents an interword character followed by at least one word-forming character, said final sequence of one or more specified values represents one or more word-forming characters followed by an interword character, and said default state identification includes only defaults due to characters other than interword characters.

22. Method of searching a stream of input digital code elements for a series of code element values of interest, which series includes an initial sequence of one or more specified values, an embedded variable length string of don't care values and a following sequence of one or more specified values; said method comprising supplying said stream as input to a finite state automaton (FSA) which is capable of existing in any one of a plurality of alternative states including a plurality of decision states with each of which a state word memory is associated, the FSA stepping automatically from each decision state to a next success state or to a next default state in response to a comparison of an input code element and one or more code element values associated with the existing state, establishing, prior to input of the code element having the first value of said initial sequence, as default state for subsequent decision states, the decision state associated with the first value of that initial sequence, establishing, prior to input of the code element having the first value of said variable length string of don't care values, as default state for subsequent decision states, the decision state associated with the first value of said following sequence, and reestablishing, subsequent to successful completion of said series of values of interest, as default state for subsequent decision states, the decision state associated with the first value of said initial sequence.

23. Method according to claim 22 wherein said next success state for each decision state is identified in the contents of the state word memory associated therewith, said FSA includes a default state register which contains an identification of a next default state common to any instant decision state, and said step of establishing a default state comprises transferring an identification of said default state to the default state register.

24. Method according to claim 23 wherein said input code elements represent groups of word-forming characters delimited by interword characters, said initial sequence of one or more specified values represents an interword character followed by at least one word-forming character, said following sequence of one or more specified values represents at least one word-forming character followed by an interword character, and said default state identification includes only defaults due to characters other than interword characters.

25. Electronic apparatus for searching a stream of input digital code elements, which represent a series of term-forming characters, simultaneously for a plurality of query terms which include terms having differently positioned variable length don't care (VLDC) character strings; said apparatus comprising a first finite state automaton (FSA) which includes means for distinguishing and reporting selected query terms containing leading VLDC strings, a second FSA which includes means for distinguishing and reporting selected query terms containing embedded VLDC strings, and a third FSA which includes means for distinguishing and reporting selected query terms containing trailing VLDC strings and also selected terms without VLDC strings in any position, means for supplying said data stream to said FSAs in parallel, and means for combining together the term reports from said individual FSAs to produce digital code representations of the reported terms.

26. Apparatus according to claim 25 including also a further FSA, means for supplying, as input to said further FSA, digital code representations of said reported terms, said further FSA including means for distinguishing and reporting selected query sequences of said input terms, and output means for supplying digital code representations of the reported term sequences.

27. A finite state automaton (FSA) responsive to a stream of input digital code elements and capable of existing in any one of a plurality of alternative states which include a plurality of decision states, the FSA stepping automatically from each decision state to a next success state or to a next default state in response to a comparison of an input code element and a code value for the existing state, and including action means controlled successively by the state word associated with each instant state for normally producing a request for supply of a next input code element upon transition of the FSA from each decision state to either a next success state or a next default state; further characterized in that said decision states include at least one try-again decision state, and said action means, when under control of the state word associated with a try-again decision state, includes means for producing a request for supply of a next input code element only upon transition to a next success state, whereby, upon transition of the FSA from a try-again decision state to a next default state, the current input code element is compared again at the next default state.

28. FSA according to claim 27 wherein the state word memory means associated with at least one of said decision states includes a plurality of indexing bits corresponding to the respective possible values of said input code elements, with set bits designating a plurality of success code values which correspond to respective success states.

29. FSA according to claim 28 wherein at least one of said next success states is a non-decision jump state, and said action means, when under control of the state word memory means associated with said jump state, includes means for producing transition of the FSA, independently of said input code elements, to a next state identified in that state word memory means.

30. FSA according to claim 27 wherein the state word associated with a decision state contains control code means normally having one value and having a special value when associated with a try-again decision state, and said action means, when under control of the state word associated with said try-again decision state, includes means responsive to said special value of said control code means for inhibiting said input code element supply upon transition of said try-again decision state to a next default state.

31. A finite state automaton (FSA) responsive to a stream of input digital code elements and capable of existing in any one of a plurality of alternative states which include a plurality of decision states at least one of which is a sequential decision state, the FSA including action means controlled successively by state word memory means associated with each instant state for producing actions characteristic of that state; further characterized in that the state word memory means associated with said sequential decision state comprises a single state word in which code values of interest are stored, and said action means, when under control of the state word memory means associated with said sequential decision state, comprise means for comparing successive input code elements and respective ones of said stored code values, and means for producing transition of the FSA to a next success state only in response to successful comparisons of all said stored code values, and for producing transition of the FSA to a next default state in response to default of any one of said comparisons.

32. FSA according to claim 31 wherein said alternative states include at least one change default non-decision state with associated state word memory means containing identification of a default state, and said action means, when under control of the state word memory means associated with said change default non-decision state, includes means for causing the so identified default state to become the next default state for subsequent decision states.

33. FSA according to claim 31 wherein said sequential decision state and said next success state are identified by consecutive state numbers.

34. FSA according to claim 33 wherein said next success state is a non-decision jump state, the state word memory means associated with said jump state containing an identification of a selected next state, and said action means, when under control of the state word memory means associated with said jump state includes means for causing the FSA to make transition to said selected next state, which thereby becomes effectively the next success state for said sequential decision state.

35. FSA according to claim 31 including means for identifying said next default state independently of the state word memory means associated with said sequential decision state.

36. FSA according to claim 35 wherein said default state identifying means comprise register means for containing the identification of a default state which is common to a plurality of decision states.

37. FSA according to claim 31 wherein said input code elements represent alphanumeric characters, and the code values stored in said single state word represent a plurality of alphanumeric characters.

38. A finite state automaton (FSA) responsive to input digital code elements which are received in groups of effectively simultaneous code elements, said FSA being capable of existing in a plurality of alternative states which include decision states, and stepping automatically from each decision state to a next success state in response to successful presentation of an input code element; said FSA including means for presenting each input code element of a first group to the FSA while in an initial state and for recording the identities of any success states resulting from such presentations, means for presenting each code element of each subsequent group to the FSA first while in said initial state and second while in each of the recorded success states, means for recording any success states resulting from such first presentations and for recording each success state resulting from such second presentations in place of the previous recording, means responsive to default of the presentations of all code elements of any group to any one recorded success state for clearing such recorded state from the record, and means for reporting predetermined sequences of successful presentations.

39. FSA according to claim 38 wherein said input digital code elements are supplied from a plurality of word searching FSAs in response to a common stream of input code representations of text characters which include interword characters, and the input code elements of each said group are code representations of text words derived by the respective word searching FSAs from a series of said character representations terminating at a common interword character.

40. A finite state automaton (FSA) responsive to a stream of input digital code elements and capable of existing in any one of a plurality of alternative states which include a plurality of decision states, said FSA including state word memory means associated with each state and action means controlled successively by the state word memory means associated with each instant state, said action means including means for stepping the FSA automatically from each decision state to a next success state or to a next default state in response to a comparison of an input code element and a code value for the existing state; further characterized in that said state word memory means associated with at least one decision state contains a plurality of indexing bits corresponding to the respective possible values of said input code elements, with set bits designating success values for the state, said action means include means for stepping the FSA from said one decision state through a plurality of sequences of distinct decision states in response to successful comparisons of series of input code elements representing respective query terms, each said state sequence terminates in a non-decision report state, the state word memory means associated with each said report state includes a specific code representation of the corresponding query term, and said action means, when under control of the state word memory means associated with a report state, includes means for causing said specific code to be transferred as an output report from the FSA for identifying said corresponding query term.

* * * * *